(12) United States Patent
Aldrich et al.

(10) Patent No.: US 10,874,220 B2
(45) Date of Patent: Dec. 29, 2020

(54) ZONED SUSPENSION SEATING STRUCTURE

(71) Applicant: Herman Miller, Inc., Zeeland, MI (US)

(72) Inventors: John F. Aldrich, Grandville, MI (US); Brock Walker, Okemos, MI (US); Jeff Bruner, Zeeland, MI (US); Adwait Bhagwat, Holland, MI (US); Ethan McGraw, Holland, MI (US); Don Chadwick, Los Angeles, CA (US)

(73) Assignee: HERMAN MILLER, INC., Zeeland, MI (US)

( * ) Notice: Subject to any disclaimer, the term of this patent is extended or adjusted under 35 U.S.C. 154(b) by 452 days.

(21) Appl. No.: 14/996,964

(22) Filed: Jan. 15, 2016

(65) Prior Publication Data

US 2016/0206102 A1  Jul. 21, 2016

Related U.S. Application Data

(60) Provisional application No. 62/104,332, filed on Jan. 16, 2015, provisional application No. 62/164,938, filed on May 21, 2015.

(51) Int. Cl.
*A47C 7/28* (2006.01)
*A47C 5/00* (2006.01)
(Continued)

(52) U.S. Cl.
CPC .............. *A47C 5/00* (2013.01); *A47C 7/282* (2013.01); *A47C 7/40* (2013.01); *A47C 31/006* (2013.01);
(Continued)

(58) Field of Classification Search
CPC .. A47C 5/02; A47C 7/282; A47C 7/40; A47C 31/006; A47C 31/02;
(Continued)

(56) References Cited

U.S. PATENT DOCUMENTS 488,095 A   12/1892   Scott
693,197 A   2/1902   White
(Continued)

FOREIGN PATENT DOCUMENTS

AU   6563380   1/1983
CN   1514697 A   7/2004
(Continued)

OTHER PUBLICATIONS

Extended European Search Report for Application No. 15165002.5 dated Sep. 30, 2015 (6 pages).
(Continued)

*Primary Examiner* — Ryan D Kwiecinski
(74) *Attorney, Agent, or Firm* — Michael Best & Friedrich LLP

(57) ABSTRACT

A body support structure includes a backrest and a seat connected to the backrest. A suspension material is connected to the backrest or the seat. The suspension material has a first zone with a first stiffness and a second zone with a second stiffness greater than the first stiffness. Also included are methods of creating different zones in the suspension material.

23 Claims, 17 Drawing Sheets

(51) Int. Cl.
  *A47C 31/00*   (2006.01)
  *B29C 55/16*   (2006.01)
  *D03D 1/00*    (2006.01)
  *A47C 31/02*   (2006.01)
  *A47C 7/40*    (2006.01)
  *D03D 15/08*   (2006.01)
  *B29C 70/56*   (2006.01)
  *B29C 51/26*   (2006.01)
  *D03D 13/00*   (2006.01)

(52) U.S. Cl.
  CPC ............ *A47C 31/02* (2013.01); *B29C 51/262* (2013.01); *B29C 55/165* (2013.01); *B29C 70/56* (2013.01); *D03D 1/00* (2013.01); *D03D 13/008* (2013.01); *D03D 15/08* (2013.01)

(58) Field of Classification Search
  CPC ............ B29C 45/14336; B29C 51/262; B29C 55/165; B29C 70/56; D03D 1/00; D03D 13/008; D03D 15/08
  See application file for complete search history.

(56) References Cited

U.S. PATENT DOCUMENTS

| | | | |
|---|---|---|---|
| 946,225 A | 1/1910 | Irwin | |
| 2,771,122 A | 8/1953 | Straub | |
| 3,041,109 A | 6/1962 | Eames et al. | |
| 3,120,407 A | 2/1964 | Propst | |
| 3,208,794 A | 9/1965 | Gunn | |
| 3,230,011 A | 1/1966 | Propst | |
| 3,300,251 A | 1/1967 | Helms | |
| 3,375,313 A * | 3/1968 | Prietzschk | B29C 67/0011 264/290.2 |
| 3,565,482 A | 2/1971 | Blodee | |
| 3,586,370 A | 6/1971 | Barecki et al. | |
| 3,640,576 A | 2/1972 | Morrison et al. | |
| 3,669,496 A | 6/1972 | Chisholm | |
| 3,844,612 A | 10/1974 | Borggren | |
| 3,877,750 A | 4/1975 | Scholpp | |
| D235,298 S | 6/1975 | Schuyler | |
| 3,914,103 A * | 10/1975 | Dean | B29C 51/262 425/397 |
| 4,036,527 A | 7/1977 | Faul | |
| 4,062,590 A | 12/1977 | Polsky et al. | |
| 4,230,365 A | 10/1980 | Messinger | |
| 4,522,444 A | 6/1985 | Pollock | |
| 4,529,247 A | 7/1985 | Stumpf et al. | |
| 4,585,272 A | 4/1986 | Ballarini | |
| 4,592,126 A | 6/1986 | Bottemiller | |
| 4,601,516 A | 7/1986 | Klein | |
| 4,889,385 A | 12/1989 | Chadwick et al. | |
| 4,913,493 A | 4/1990 | Heidmann | |
| 5,100,713 A * | 3/1992 | Homma | B29C 70/10 139/383 R |
| 5,102,196 A | 4/1992 | Kaneda et al. | |
| 5,114,210 A | 5/1992 | Naess | |
| 5,240,308 A | 8/1993 | Goldstein | |
| 5,320,410 A | 6/1994 | Falks et al. | |
| 5,328,245 A | 7/1994 | Marks | |
| 5,352,022 A | 10/1994 | Knoblock | |
| 5,518,294 A | 5/1996 | Ligon, Sr. et al. | |
| D377,431 S | 1/1997 | Stumpf et al. | |
| 5,649,743 A | 7/1997 | Stalka | |
| 5,660,439 A | 8/1997 | Unwalla | |
| 5,664,835 A | 9/1997 | Desanta | |
| D386,023 S | 11/1997 | Stumpf et al. | |
| D390,026 S | 2/1998 | Biecher | |
| 5,842,264 A | 12/1998 | Roossien et al. | |
| 5,918,935 A | 7/1999 | Stulik et al. | |
| 5,954,399 A | 9/1999 | Hong | |
| 5,975,634 A | 11/1999 | Knoblock et al. | |
| 6,015,187 A | 1/2000 | Roslund, Jr. et al. | |
| 6,050,646 A | 4/2000 | Stenzel et al. | |
| 6,059,368 A * | 5/2000 | Stumpf | A47C 1/03 297/440.11 |
| D436,259 S | 1/2001 | Nagamitsu | |
| D436,260 S | 1/2001 | Nagamitsu | |
| D437,132 S | 2/2001 | Nagamitsu | |
| 6,193,318 B1 | 2/2001 | Becker et al. | |
| D441,977 S | 5/2001 | Vaaler | |
| D442,383 S | 5/2001 | Bell | |
| 6,234,573 B1 | 5/2001 | Roder et al. | |
| D444,309 S | 7/2001 | Nagamitsu | |
| 6,254,190 B1 * | 7/2001 | Gregory | A47C 5/06 297/440.11 |
| 6,257,665 B1 | 7/2001 | Nagamitsu et al. | |
| 6,439,665 B1 | 8/2002 | Cvek | |
| D465,347 S | 11/2002 | Bell | |
| 6,505,890 B2 | 1/2003 | Riley et al. | |
| D469,618 S | 2/2003 | Nagamatsu | |
| D469,970 S | 2/2003 | Molteni | |
| 6,513,874 B1 | 2/2003 | Sander et al. | |
| 6,540,950 B1 * | 4/2003 | Coffield | A47C 7/282 156/245 |
| 6,572,190 B2 | 6/2003 | Koepke et al. | |
| D476,493 S | 7/2003 | Nagamitsu | |
| D476,820 S | 7/2003 | Nagamitsu | |
| 6,609,754 B2 | 8/2003 | Rajasingham | |
| D481,560 S | 11/2003 | Vidmar et al. | |
| D482,542 S | 11/2003 | Pluer | |
| 6,644,752 B2 | 11/2003 | Takata | |
| D487,359 S | 3/2004 | Giugiaro | |
| D489,542 S | 5/2004 | Giugiaro | |
| 6,749,261 B2 | 6/2004 | Knoblock et al. | |
| 6,820,933 B2 | 11/2004 | Da Silva | |
| 6,896,328 B2 | 5/2005 | Goodworth | |
| D509,969 S | 9/2005 | Loew et al. | |
| D511,629 S | 11/2005 | Caldwell | |
| D512,578 S | 12/2005 | Igarashi | |
| D512,579 S | 12/2005 | Igarashi | |
| D513,910 S | 1/2006 | Gehry | |
| 6,986,549 B2 | 1/2006 | Kniese | |
| 6,991,291 B2 | 1/2006 | Knoblock et al. | |
| D514,345 S | 2/2006 | Igarashi | |
| D514,838 S | 2/2006 | Igarashi | |
| 7,055,911 B2 | 6/2006 | Simpson et al. | |
| D526,495 S | 8/2006 | Albin | |
| 7,097,249 B2 | 8/2006 | Igarashi et al. | |
| D527,920 S | 9/2006 | Giugiaro | |
| D528,810 S | 9/2006 | Giugiaro | |
| D528,811 S | 9/2006 | Giugiaro | |
| D528,812 S | 9/2006 | Giugiaro | |
| D540,557 S | 4/2007 | Doughty | |
| D542,549 S | 5/2007 | Hara | |
| D542,580 S | 5/2007 | Loew et al. | |
| D543,039 S | 5/2007 | Hara | |
| D543,040 S | 5/2007 | Hara | |
| D543,041 S | 5/2007 | Hara | |
| D543,042 S | 5/2007 | Hara | |
| D543,369 S | 5/2007 | Hara | |
| D543,371 S | 5/2007 | Wang | |
| D543,385 S | 5/2007 | Loew et al. | |
| D543,397 S | 5/2007 | Loew et al. | |
| D543,736 S | 6/2007 | Shields | |
| 7,226,127 B1 | 6/2007 | Yevko et al. | |
| 7,243,993 B2 | 7/2007 | Igarashi et al. | |
| 7,252,336 B2 | 8/2007 | Frisina | |
| D550,471 S | 9/2007 | Igarashi | |
| D550,977 S | 9/2007 | Igarashi | |
| D552,368 S | 10/2007 | Scheper et al. | |
| D552,882 S | 10/2007 | Saotome | |
| D554,384 S | 11/2007 | Scheper et al. | |
| D555,924 S | 11/2007 | Igarashi | |
| D557,921 S | 12/2007 | Kaneda et al. | |
| D559,000 S | 1/2008 | Vanderminden, Sr. | |
| 7,320,503 B2 | 1/2008 | Eysing | |
| D572,915 S | 7/2008 | Doughty | |
| D573,816 S | 7/2008 | Muller | |
| 7,406,733 B2 | 8/2008 | Coffield et al. | |
| 7,455,365 B2 | 11/2008 | Caruso et al. | |
| 7,461,442 B2 * | 12/2008 | Johnson | A47C 7/282 29/243.5 |

(56) References Cited

U.S. PATENT DOCUMENTS

| | | | |
|---|---|---|---|
| 7,517,024 B2 | 8/2009 | Cvek | |
| 7,648,201 B2 | 1/2010 | Eysing | |
| 7,677,873 B2* | 3/2010 | Sayers | B29C 31/008 |
| | | | 425/111 |
| 7,731,295 B2 | 6/2010 | Lin | |
| 7,926,879 B2 | 4/2011 | Schmitz et al. | |
| 8,871,298 B2* | 10/2014 | Roehrig | H01L 51/0097 |
| | | | 427/171 |
| 8,967,726 B2 | 3/2015 | Schmitz et al. | |
| 9,174,485 B2* | 11/2015 | Lareau | D06F 59/08 |
| 9,462,891 B2* | 10/2016 | Kikuchi | D03D 15/08 |
| 9,668,580 B2 | 6/2017 | Schmitz et al. | |
| 10,016,060 B2 | 7/2018 | Schmitz et al. | |
| 2003/0001420 A1* | 1/2003 | Koepke | A47C 1/03255 |
| | | | 297/440.15 |
| 2003/0189367 A1 | 10/2003 | Erker | |
| 2003/0227211 A1 | 12/2003 | Rowland et al. | |
| 2004/0032156 A1 | 2/2004 | Stipek | |
| 2006/0181126 A1 | 8/2006 | Eysing | |
| 2006/0207296 A1* | 9/2006 | Fujikawa | D04B 1/18 |
| | | | 66/202 |
| 2006/0238009 A1 | 10/2006 | Igarashi et al. | |
| 2006/0244295 A1 | 11/2006 | Igarashi et al. | |
| 2006/0255645 A1* | 11/2006 | Coffield | A47C 7/282 |
| | | | 297/452.13 |
| 2008/0122284 A1 | 5/2008 | Yang | |
| 2008/0264425 A1 | 10/2008 | Mundell | |
| 2009/0042014 A1 | 2/2009 | Synnestvedt et al. | |
| 2010/0117419 A1 | 5/2010 | Schmitz et al. | |
| 2010/0119635 A1 | 5/2010 | Sayers et al. | |
| 2010/0289308 A1 | 11/2010 | Schmitz et al. | |
| 2010/0319801 A1* | 12/2010 | Legrand | D03C 13/00 |
| | | | 139/11 |
| 2011/0175423 A1* | 7/2011 | Schmitz | A47C 1/03277 |
| | | | 297/411.2 |
| 2013/0147252 A1 | 6/2013 | Schmitz et al. | |
| 2017/0340934 A1* | 11/2017 | Kohler | D03D 1/00 |
| 2017/0355129 A1* | 12/2017 | McGraw | B29C 45/14065 |
| 2018/0064263 A1* | 3/2018 | Wang | A47C 31/023 |
| 2018/0347081 A1* | 12/2018 | Kurahashi | G01B 7/18 |
| 2019/0307250 A1* | 10/2019 | Masunaga | A47C 7/32 |
| 2019/0352807 A1* | 11/2019 | Jhunjhunwala | D03D 15/0077 |
| 2020/0023614 A1* | 1/2020 | Dellea | G03F 7/0037 |
| 2020/0063300 A1* | 2/2020 | Hurd | B32B 5/26 |

FOREIGN PATENT DOCUMENTS

| | | |
|---|---|---|
| CN | 1671316 A | 9/2005 |
| DE | 4433663 | 3/1996 |
| DE | 29505064 | 7/1996 |
| DE | 19916411 | 11/2000 |
| EP | 49310 | 4/1982 |
| EP | 860355 | 8/1998 |
| EP | 250109 | 10/2000 |
| EP | 1177935 | 2/2002 |
| EP | 1454571 | 9/2004 |
| FR | 2715124 | 7/1995 |
| JP | 2009112360 | 5/2009 |
| LU | 88528 | 3/1996 |
| WO | 1998019578 | 5/1998 |
| WO | WO2007/110737 | 10/2007 |
| WO | WO2009/039231 | 3/2009 |
| WO | WO2014147663 | 9/2014 |

OTHER PUBLICATIONS

International Search Report and Written Opinion for Application No. PCT/US16/13646 dated Apr. 1, 2016 (19 pages).
Eysing, Voker W., "Der Natur entlehnt—Derived from Nature," md Magazine of Design, Oct. 2005 (5 pages).
Faraday, "Exploring Biomimetrics for Products & Packaging," Sep. 27, 2007 (3 pages).
Okamura Corporation, "Baron ErgonomicMesh Chair," copyright 2005, [online] [retrieved from internet: URL: http:// www.okamura.co.jp/english/producl/office/baron/index.html], [retrieved on Mar. 31, 2008] (1 page).
Herman Miller for Business, "Eames Aluminum Group & Soft Pad Chairs," [online] [retrieved from internet: URL http:// www.hermanmiller.com/CDA/SSA/Produc1/1,1592,a1O-c440-p39,00.html], [retrieved dale unknown] (2 pages).
Extended Search Report from the European Patent Office for related Application No. 16737982.5 dated Jun. 28, 2018 (8 pages).
Examination Report issued from the European Patent Office for related Application No. 16737982.5 dated Oct. 15, 2019 (4 pages).
Office Action issued from the India Patent Office for related Application No. 201747028458 dated Oct. 22, 2019 (8 pages including statement of Relevance).
Office Action issued from the Chinese Patent Office for related Application No. 201680005913.X (22 pages including English Translation).
Examination Report issued from the Australian Patent Office for related Application No. 2016206557 dated Aug. 22, 2019 (3 pages).

* cited by examiner

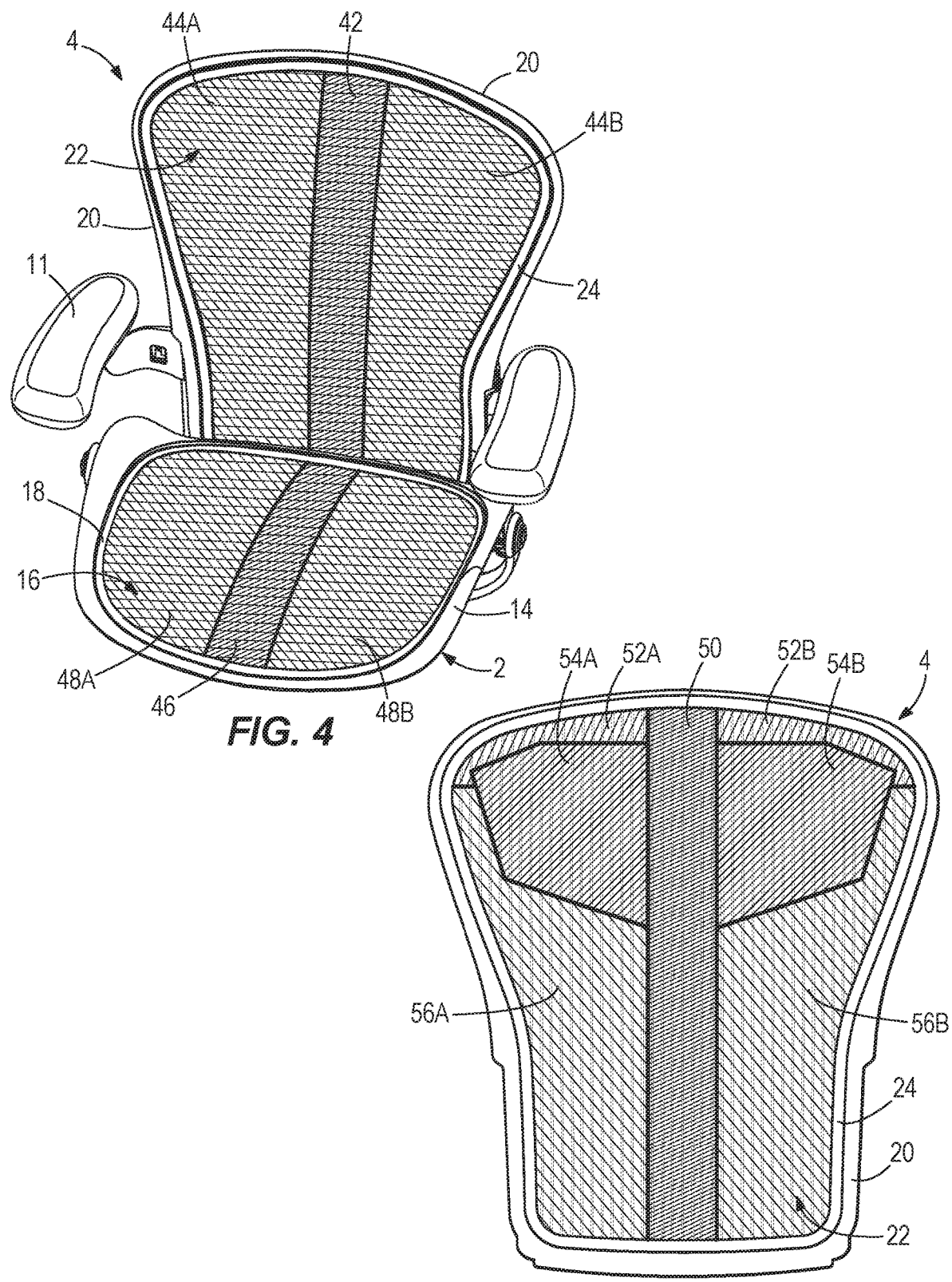

ZONED SUSPENSION SEATING STRUCTURE

RELATED APPLICATION(S)

This application is based on U.S. Provisional Application Ser. No. 62/104,332, filed Jan. 16, 2015 and U.S. Provisional Application Ser. No. 62/164,938, filed May 21, 2015, the disclosures of which are incorporated herein by reference in their entirety and to which priority is claimed.

FIELD

Various exemplary embodiments relate to a seating structure.

BACKGROUND

Seating structures may be configured with a suspension material secured to a frame over an opening. Often, the suspension material is put in tension over the opening. When used as a seat, the suspension material must be able to sustain relatively large tension loads applied by the user. Typical suspension members have a uniform tension applied along one direction, whether front-to-back, or side-to-side. As such, the stiffness of the suspension material when installed in a seating structure may tend to be relatively homogenous.

One example of a seating structure includes office chairs. Office chairs are typically configured to allow tilting of the seat and backrest as a unit or tilting of the backrest relative to the seat. In chairs having a backrest pivotally attached to a seat in a conventional manner, the movement of the backrest relative to the seat can create shear forces acting on the legs and back of the user.

Office chairs typically include single or multi-density foam padding with a covering such as cloth, leather or the like. This type of seating provides a deformable cushion which conforms to the user's buttocks. However, a deformable cushion does not provide a self-adjusting support which varies according to the position of the user and the tilt position of the seat. Such seating also tends to provide insufficient aeration. In chairs incorporating flexible membranes, the membranes are typically attached directly to the frame of a seat. Often the membrane is attached to the frame by wrapping edge portions of the membrane around spaced apart rods which define the frame. The membrane of such a seat is difficult to repair and/or replace since the chair would typically have to be disassembled to allow such maintenance. In addition, the structural requirements of such an attachment limits the shape and size of the frame and the membrane.

SUMMARY

According to an exemplary embodiment, a body support structure includes a backrest and a seat connected to the backrest. A suspension material is connected to the backrest or the seat. The suspension material has a first zone with a first stiffness, a second zone with a second stiffness greater than the first stiffness, and a transition zone positioned between the first region and the second region.

Another exemplary embodiment includes a method of making a seating structure. A support structure having a suspension material is divided into a first zone and a second zone. Energy is applied to the second zone to increase the stiffness of the suspension material.

Another exemplary embodiment includes a method of making a suspension member with differential stiffness. A blank of suspension material is provided. The blank of suspension material is engaged with a plurality of clamping elements along at least one side of the suspension material. Different tensions are applied to the blank of suspension material with different clamping elements.

BRIEF DESCRIPTION OF THE DRAWINGS

The aspects and features of various exemplary embodiments will be more apparent from the description of those exemplary embodiments taken with reference to the accompanying drawings, in which:

FIG. 4 is a perspective view of a backrest and seat with exemplary zones;
FIG. 5 is a front view of a backrest with exemplary zones.

DETAILED DESCRIPTION OF EXEMPLARY EMBODIMENTS

Various exemplary embodiments are related to seating structures and methods of creating seating structures. Seating structures may include any structure used to support a body of a user, for example, without limitation, office chairs, chairs, sofas, airplane seats, vehicle seats, bicycle seats, boat seats, beds, dental and medical seats and beds, auditorium and educational seating, etc. It should be understood that the various methods and devices disclosed herein may be applied to seating structures other than a seat and/or backrest, including for example and without limitation armrests, headrests and other ergonomic positioning features. In addition, the various methods and devices may be applied to structures employing a frame and suspension material other than seating structures. Although the illustrated embodiments are shown in connection with an office chair, other embodiments can include different configurations.

Figure 1:
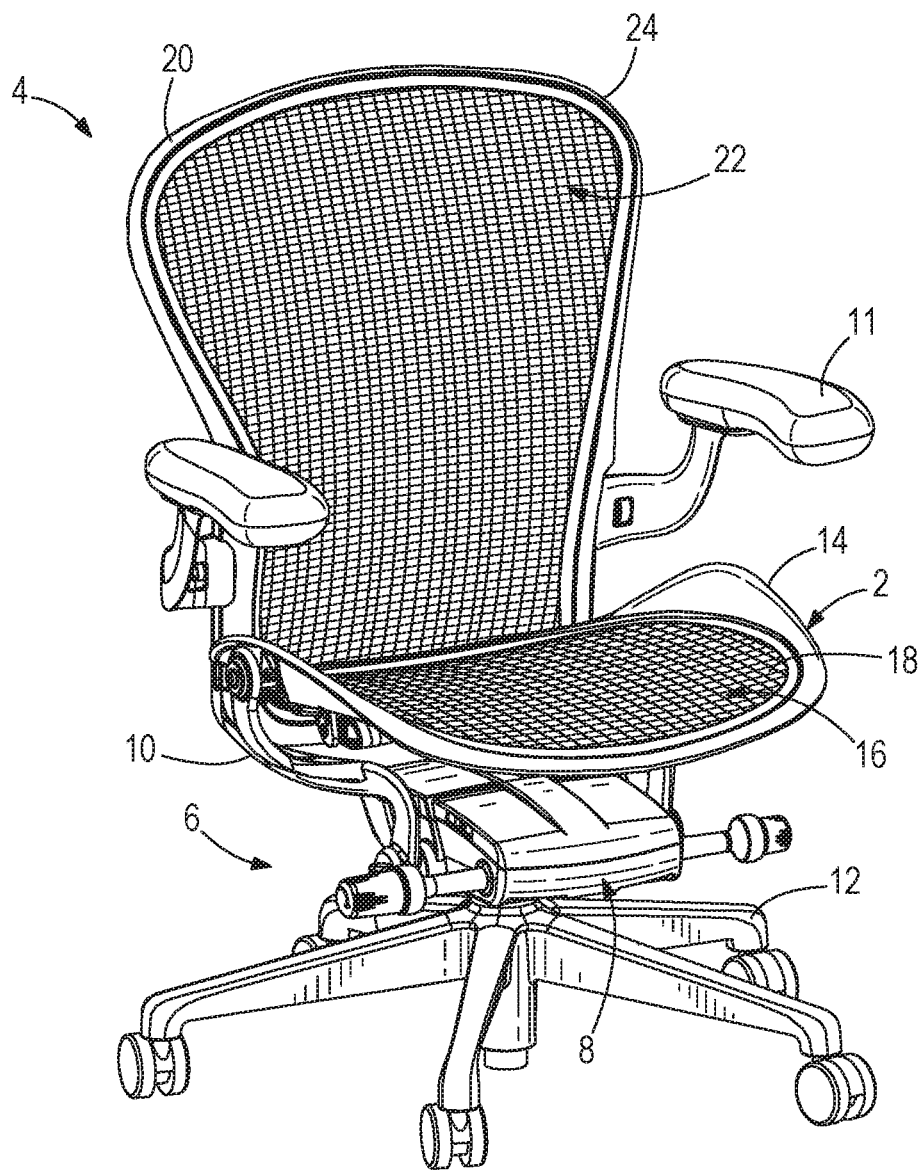
FIG. 1 is a perspective view of an exemplary chair.

FIG. 1 shows an exemplary embodiment of a seating structure configured as a chair that includes a seat 2, a backrest 4 and a base 6. The base includes a tilt control housing 8, a support column 10 coupled to and supporting the tilt control housing 8 and a base structure 12 coupled to and supporting the support column 10. A pair of armrests 11 may be connected to the chair.

The seat 2 includes a frame 14, a suspension material 16, and a carrier 18. The carrier 18 retains the suspension material 16 and connects to the frame 14. In the exemplary embodiments shown, the frame 14 is formed as a ring having a front, a back, and a pair of sides defining an opening. The frame 14 may also be formed from side members, a top member, and a bottom member. Different sizes, shapes, and configurations of the frame 14 can be used according to aesthetics, ergonomics, space, or other considers. The frame 14 may be integrally formed as a single, homogenous unit, or formed of separate components.

The backrest 4 includes a frame 20, a suspension material 22, and a carrier 24. The carrier 24 retains the suspension material 22 and connects to the frame 20. In the exemplary embodiments shown, the frame 20 is formed as a ring having a front, a back, and a pair of sides defining an opening. The frame 20 may also be formed from side members, a top member, and a bottom member. Different sizes, shapes, and configurations of the frame 20 can be used according to aesthetics, ergonomics, space, or other considers. The frame 20 may be integrally formed as a single, homogenous unit, or formed of separate components.

Various methods of connecting the suspension material 16, 22 can be used, including bonding and adhesive or mechanical fasteners, such as staples, or in-molding. When the carrier 18, 24 is engaged with the frame 14, 20, the suspension material 16, 22 spans across the seat 2 and backrest 4 openings.

Figure 2:
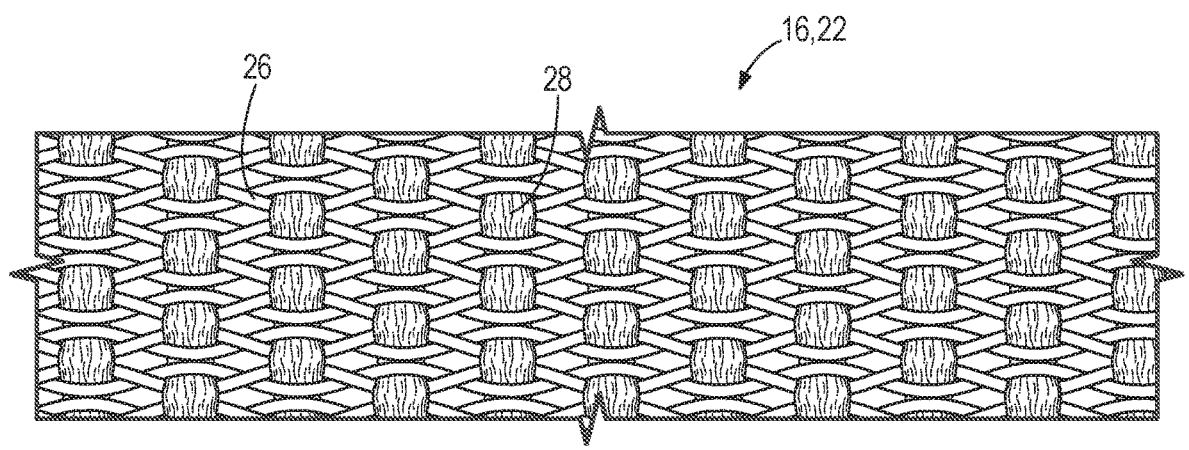
FIG. 2 is a partial view of an exemplary suspension material.

The suspension material 16, 22 may be made of a woven or knit material, including various elastomeric materials, or fabrics, or various molded polymeric materials. The seat 2 and backrest 4 may utilize the same type of material or different materials for the suspension material 16, 22. In various exemplary embodiments, the suspension material 16, 22 can include a plurality of monofilaments 26 interlaced with a plurality of multifilament strands 28 as best shown in FIG. 2. The monofilaments 26 can be the primary load carrying members and run laterally in the warp direction of the seat 2 and backrest 4 while the multifilament strands 28 run longitudinally in the weft direction. Additionally, monofilaments 26 and/or multifilaments 28 may be combined to run in both the lateral and longitudinal directions if necessary.

Various suspension materials and constructions are disclosed in U.S. Pat. No. 6,035,901 and U.S. Pub. No. 2013/0099548, the entire disclosures of which are hereby incorporated herein by reference in their entirety. It should be understood that the suspension material 16, 22 may be attached to the frame 14, 20 in other suitable ways, such as by directly attaching the suspension material 16, 22 to the frame 14, 20 without a carrier 18, 24, including by molding, bonding, mechanical fasteners, other know devices, and combinations thereof.

According to various exemplary embodiments, the suspension material 16, 22 can include different zones. The zones can be designed to increase the comfort and/or support of the seating structure for a user. Different zones can include different levels of stiffness or flexibility. Differential zones of stiffness in the suspension material 16, 22 may be developed in different ways related to the construction of the suspension material, and the process for introducing tension.

One exemplary embodiment of creating different stiffness in the suspension material 16, 26 includes engineered textiles (ET). In ET, the type, number, and spacing of monofilaments 26 and multifilaments 28 are adjusted to create different levels of stiffness. For example, the orientation of the monofilaments 26 can be changed from longitudinal to lateral in certain areas to achieve a high tension zone. Additionally, monofilaments 26 and/or multifilaments 28 may be combined to run in both the lateral and longitudinal directions if necessary. Monofilaments 26 and multifilaments 28 having different elastic modulus can also be used in different zones to increase or decrease stiffness. The density of monofilaments 26 and multifilaments 28 can also be adjusted to increase or decrease stiffness. According to an exemplary embodiment, a standard monofilament 26 has a 55 shore D durometer with an elastic modulus of 180 Mpa, and the level of stiffness is decreased or increased in different zones as needed. The term standard stiffness can also be used to mean an industry, brand, or model standard or the relative general stiffness of other parts of a seating structure or suspension material. Monofilaments 26 and multifilaments 28 having different levels of stretch can also be used in different zones.

Another exemplary embodiment for creating different stiffness includes utilizing thermally engineered suspension (TES). In a TES procedure, energy is applied to the suspension material 16, 22 to alter its stiffness. The energy can come from a variety of different sources including high temperature steam application, forced hot air, laser, microwaves, high output UV, infrared emitter, plasma, and/or contact heat. The suspension material 16, 22 can be altered before or after being placed into the carrier 18, 24 or the frame 14, 20. Within ET and TES, there are many other sub-paths that vary the mechanical properties, zonal pretension and weave patterns.

Figure 3:
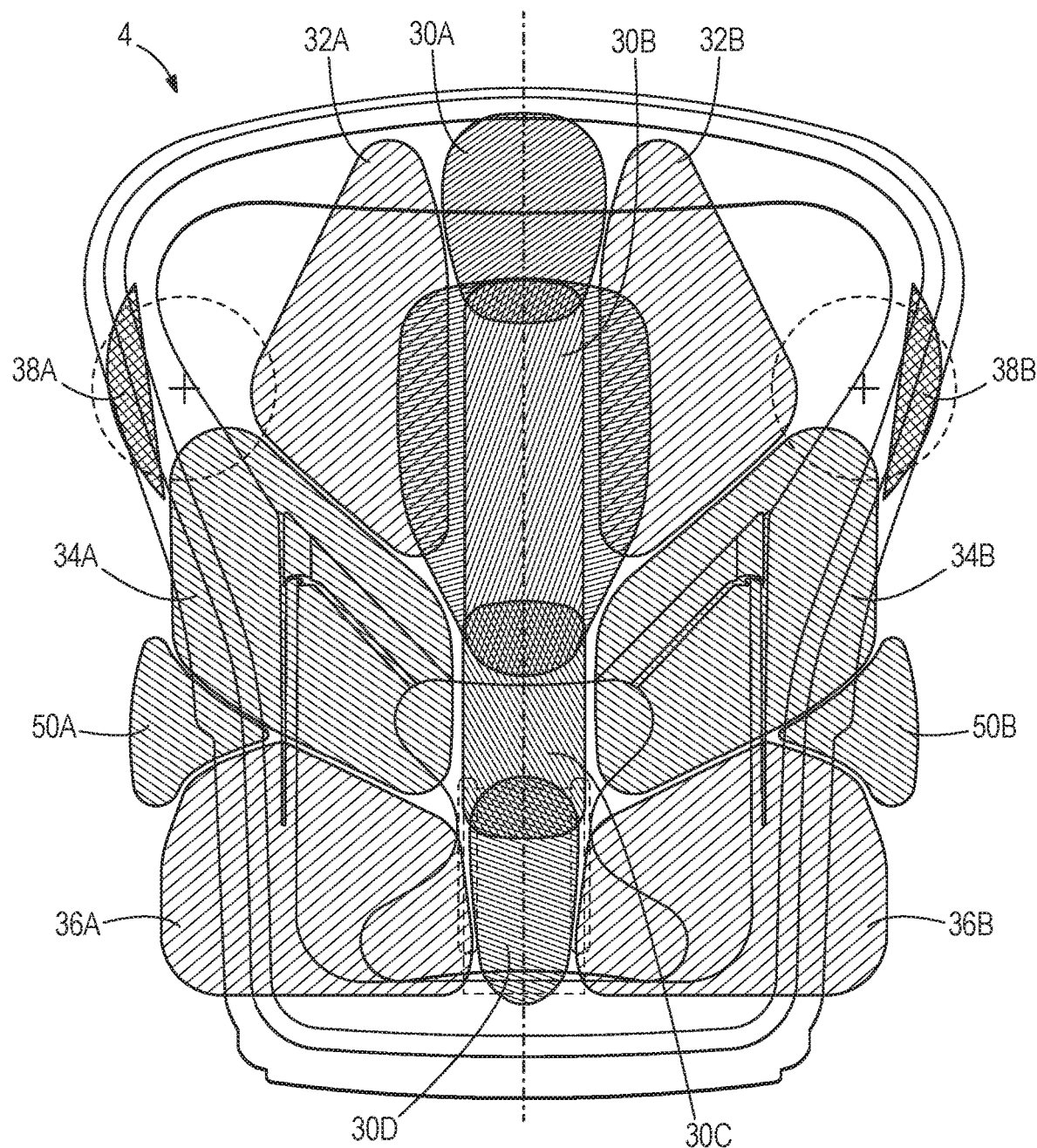
FIG. 3 is a front schematic view of a backrest and exemplary anatomical zones.

FIG. 3 shows a backrest 4 and an example of a breakdown of different anatomical zones associated with a user's back. The zones include central zones 30A-D, upper side zones 32A, 32B, middle side zones 34A, 34B, lower side zones 36A, 36B, shoulder socket zones 38A, 38B, and arm zones 50A, 50B. The support of these zones can be controlled by adjusting the stiffness in each area. For example, the central zones 30A-D are provided with a first stiffness or stiffness range, the middle side zones 34A, 34B are provided with a second stiffness or stiffness range, and the upper side zones 32A, 32B and lower side zones 36A, 36B are provided with a third stiffness or stiffness range. In an exemplary embodiment, the central zones 30A-30D are approximately 2 inches wide to approximately 6 inches wide. For example approximately 3 inches wide to approximately 5 inches wide. The size, number and spacing of the zones can be varied.

In an exemplary embodiment, the first stiffness or range can be configured to provide support, the second stiffness or range can be configured to provide stability, and the third stiffness or range can be configured to relieve pressure or stress. In an exemplary embodiment, this can mean that the second stiffness or range is less than the first stiffness or range and the third stiffness or range is less than the second stiffness or range. In other exemplary embodiments, the stiffness of the central zones 30A-D can vary or be variable, for example increasing from the top zone 30A to the bottom zone 30D, with each zone having a greater stiffness than the second stiffness or range.

FIG. 4 shows an exemplary embodiment of a chair having a seat 2 and a backrest 4. The backrest 4 has a central zone 42, and side zones 44A, 44B. The central zone 42 has a stiffness or range greater than the side zones 44A, 44B. The seat 2 also has a central zone 46, and side zones 48A, 48B. The central zone 46 has a stiffness or range greater than the side zones 48A, 48B.

FIG. 5 shows a backrest 4 having a central zone 50 with a first stiffness or range, top side zones 52A, 52B with a second stiffness or range, shoulder zones 54A, 54B with a third stiffness or range, and lower zones 56A, 56B with a fourth stiffness or range. The central zone 50 and the top side zones 52A, 52B can have a greater stiffness than the shoulder zones 54A, 54B and the lower zones 56A, 56B. In an exemplary embodiment, central zone 50 and the top side zones 52A, 52B have a stiffness that is greater than a standard stiffness, for example up to 4 times the standard stiffness and the shoulder zones 54A, 54B can have a stiffness that is less than the standard stiffness, for example from the standard stiffness to half the standard stiffness. In certain embodiments, the central zone 50 and the top side zones 52A, 52B can be combined in a T configuration.

Figure 6:
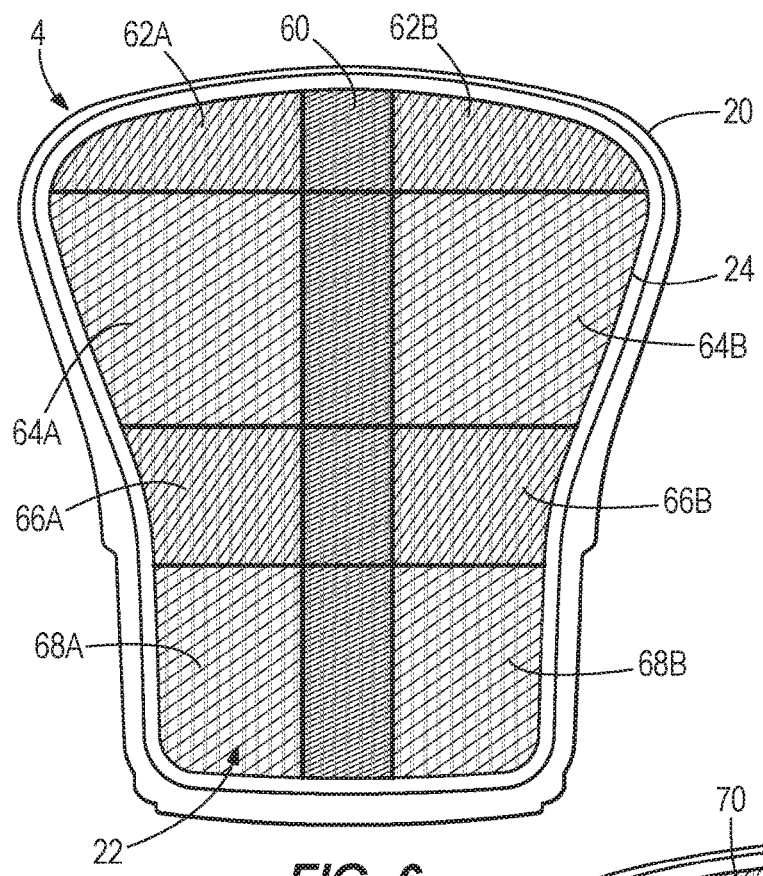
FIG. 6 is a front view of a backrest with exemplary zones.

FIG. 6 shows a backrest 4 having a central zone 60, top side zones 62A, 62B, upper side zones 64A, 64B, middle side zones 66A, 66B, and lower side zones 68A, 66B, with each zone having a stiffness or stiffness range. In an exemplary embodiment, the central zone 60 has the greatest stiffness or range and the top side zones 62a, 62B and the middle side zones 66A, 66B have a stiffness or range greater than the upper side zones 64A, 64B and the lower side zones 68A, 68B. In certain embodiments, the central zone 60 and the top side zones 62A, 62B can be combined in a T configuration, the central zone 60 can be combined with the middle side zones 66A, 66B in a cross-configuration, or a combination therefore.

Figure 7:
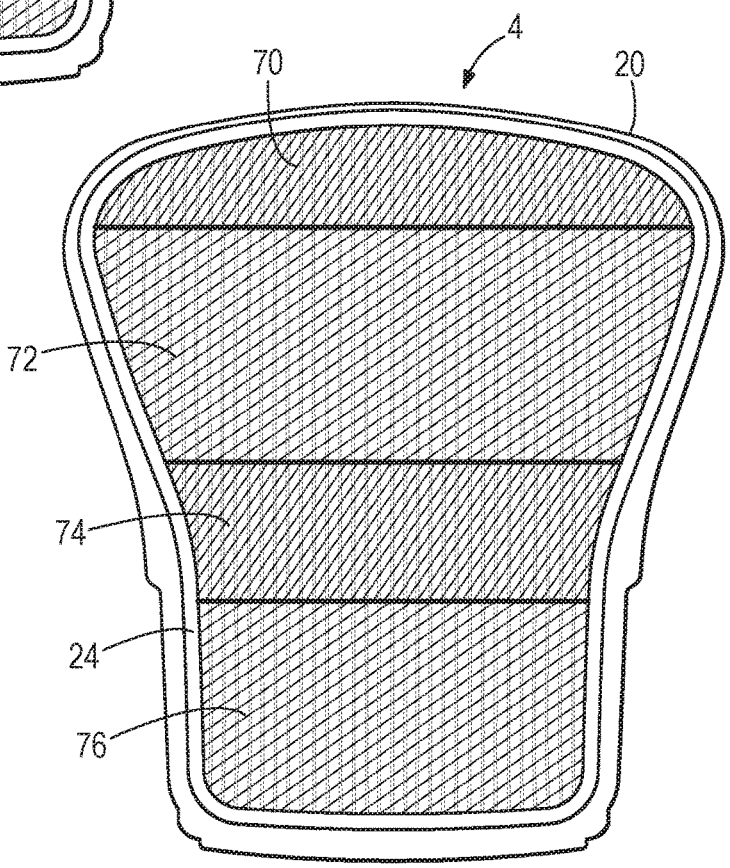
FIG. 7 is a front view of a backrest with exemplary zones.

FIG. 7 shows a backrest 4 having a top zone 70, an upper zone 72, a middle side zone 74, and a lower zone 76, with each zone having a stiffness or stiffness range. In an exemplary embodiment, the top zone 70 and the middle zone 74 have a stiffness or range greater than the upper side zone 72 and the lower zone 76.

Figure 8:
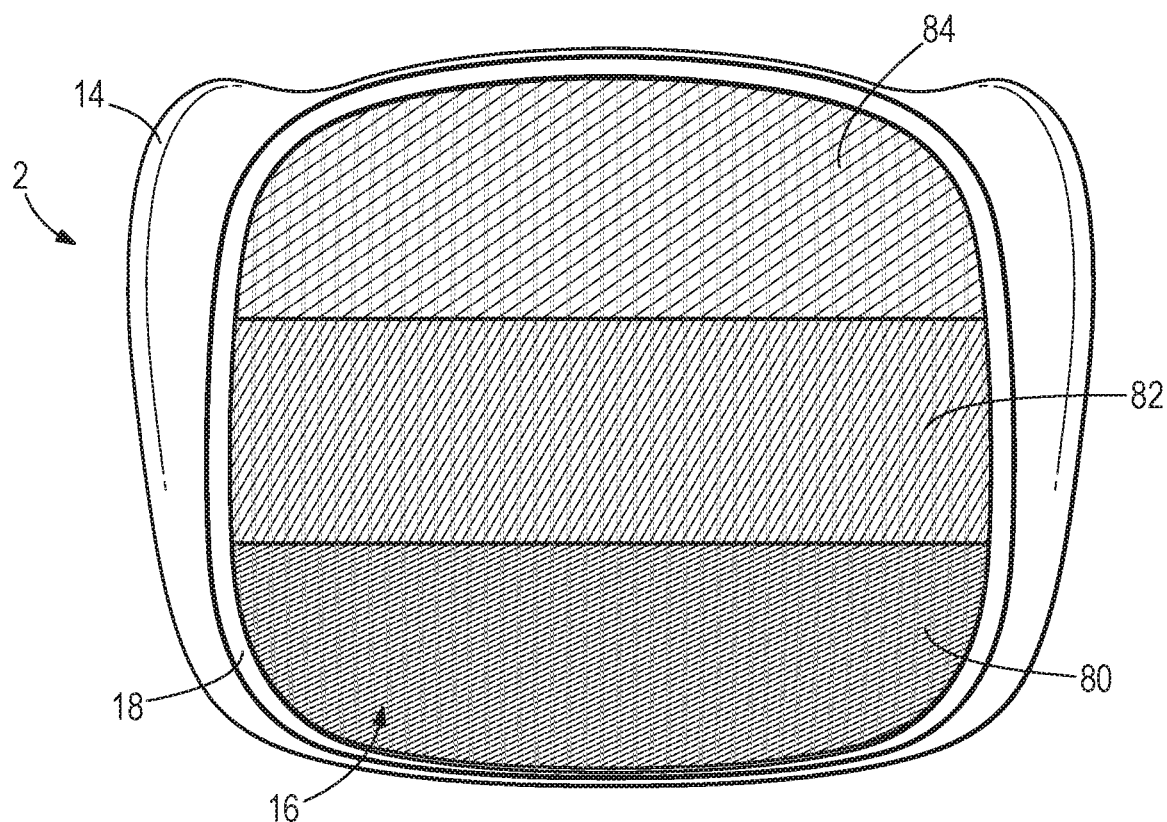
FIG. 8 is a top view of a seat with exemplary zones.

FIG. 8 shows a seat 2 having a front zone 80, a middle zone 82, and a rear zone 84, with each zone having a stiffness or stiffness range. In an exemplary embodiment, the front zone 80 has a greater stiffness or range than the middle zone 82 and the middle zone 82 has a greater stiffness or range than the rear zone 84. For example, the front zone 80 has a stiffness or range up to three times or four times a standard stiffness, the middle zone 82 has a standard stiffness, and the rear zone 84 has a stiffness or range from the standard stiffness to half the standard stiffness. In an alternative embodiment, the seat may be provided with just a front and rear zone with the front zone having a stiffness or stiffness range greater than the rear zone.

Figure 9:
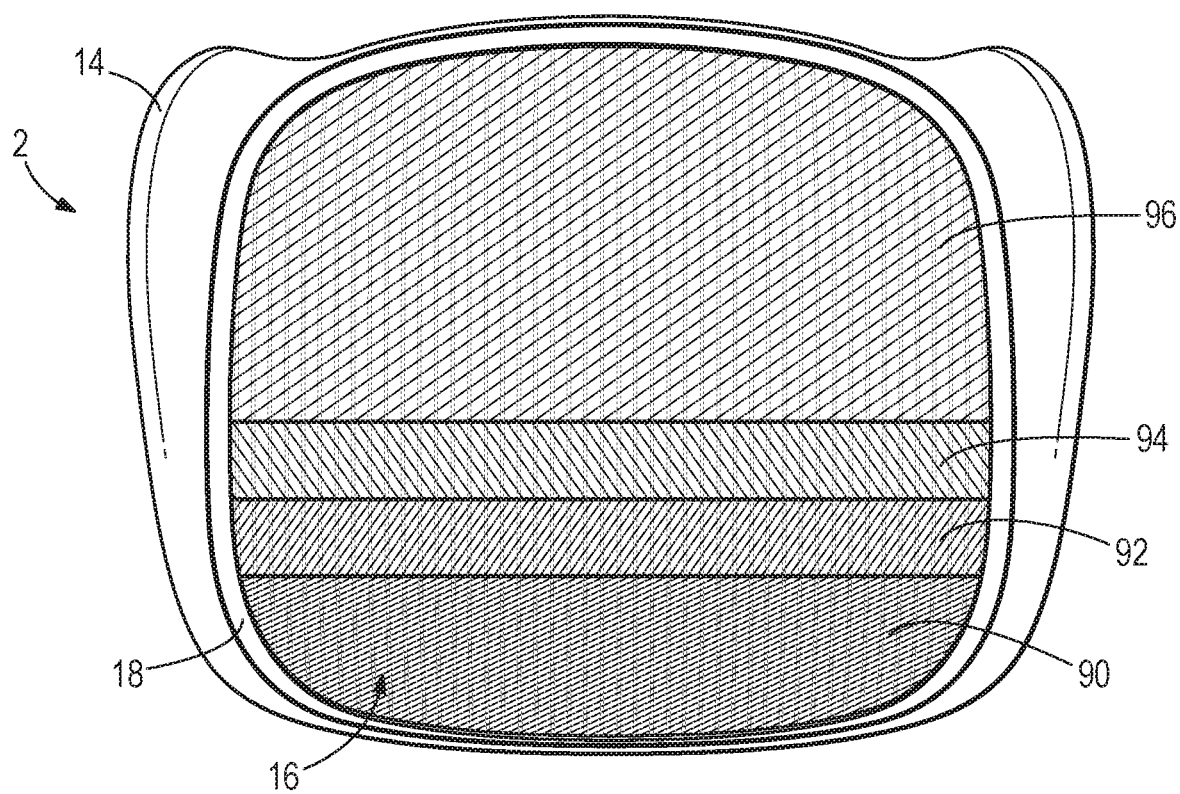
FIG. 9 is a top view of a seat with exemplary zones.
Figure 10:
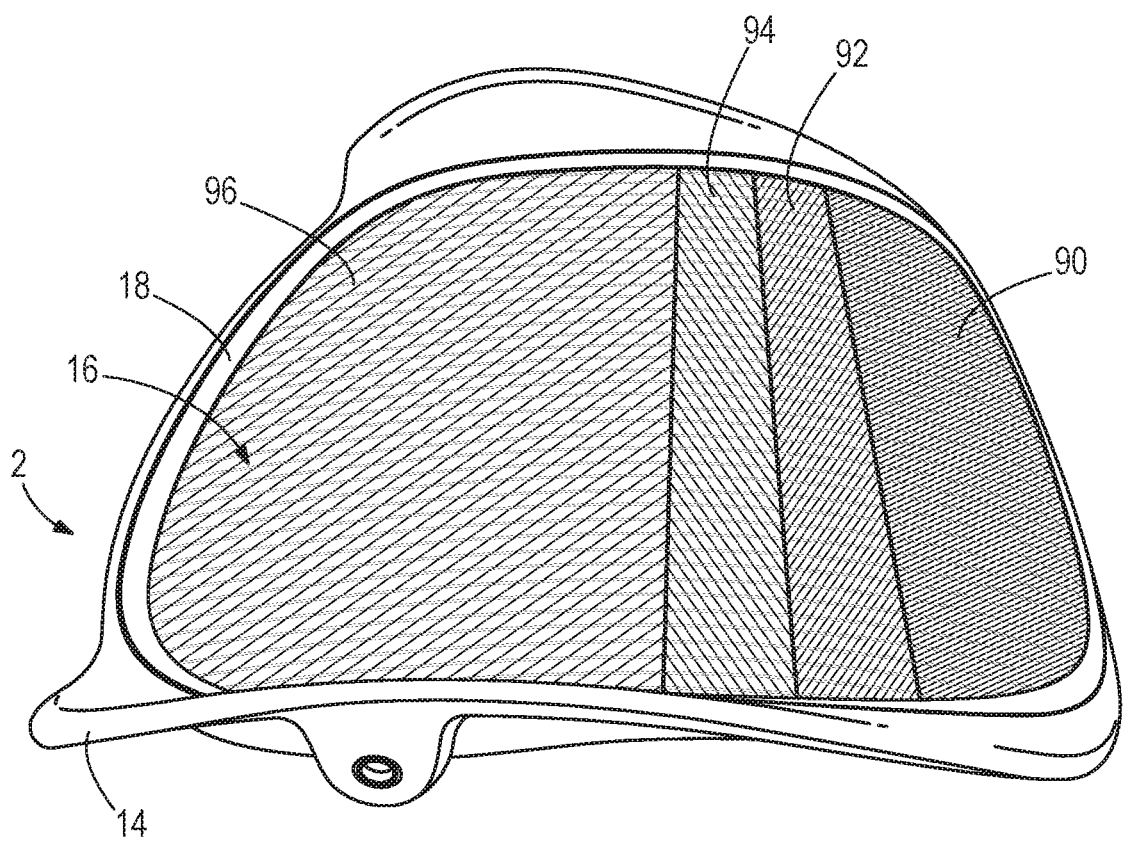
FIG. 10 is a top view of a seat with exemplary zones.

FIGS. 9 and 10 show a seat 2 having a front zone 90, a first middle zone 92, a second middle zone 94 and a rear zone 96, with each zone having a stiffness or stiffness range. In an exemplary embodiment, the stiffness or range decreases from the front to the rear of the seat 2. For example, the front zone 90 has a stiffness or range up to four times a standard stiffness, the first middle zone 92 has a stiffness or range up to three times a standard stiffness, the second middle zone 94 has a stiffness or range up to two times a standard stiffness, and the rear zone 86 has a standard stiffness.

Figure 11:
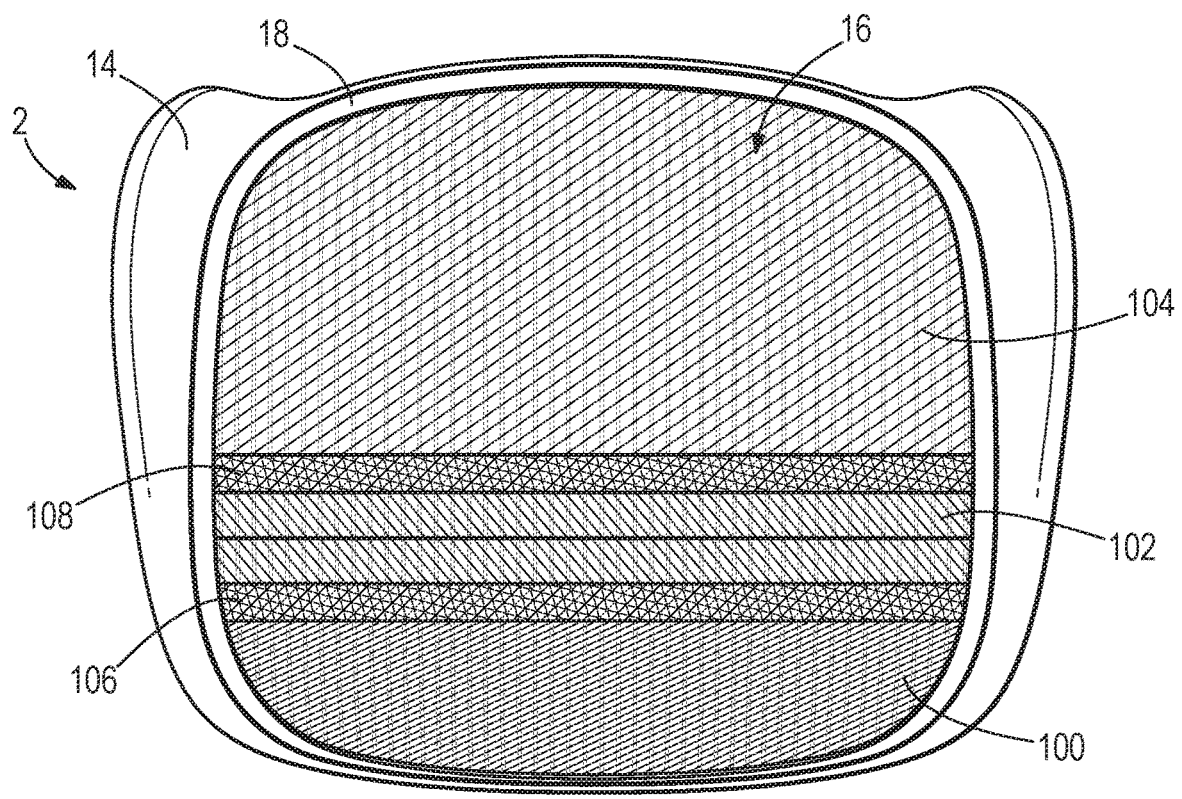
FIG. 11 is a top view of a seat with exemplary zones.

FIG. 11 shows a seat 2 having a front zone 100, a middle zone 102, and a rear zone 104, with each zone having a stiffness or stiffness range. The suspension material 16 also includes a first transition zone 106 and a second transition zone 108. In an exemplary embodiment, the front zone 100 has a greater stiffness or range than the middle zone 102 and the middle zone 102 has a greater stiffness or range than the rear zone 104. The first transition zone 106 has a stiffness or range between that of the front zone 100 and the middle zone 102 and the second transition zone 108 has a stiffness or range between that of the middle zone 102 and the rear zone 104. In an exemplary embodiment, the transition zones 106, 108 are approximately 0.5 inches in width.

Figure 12:
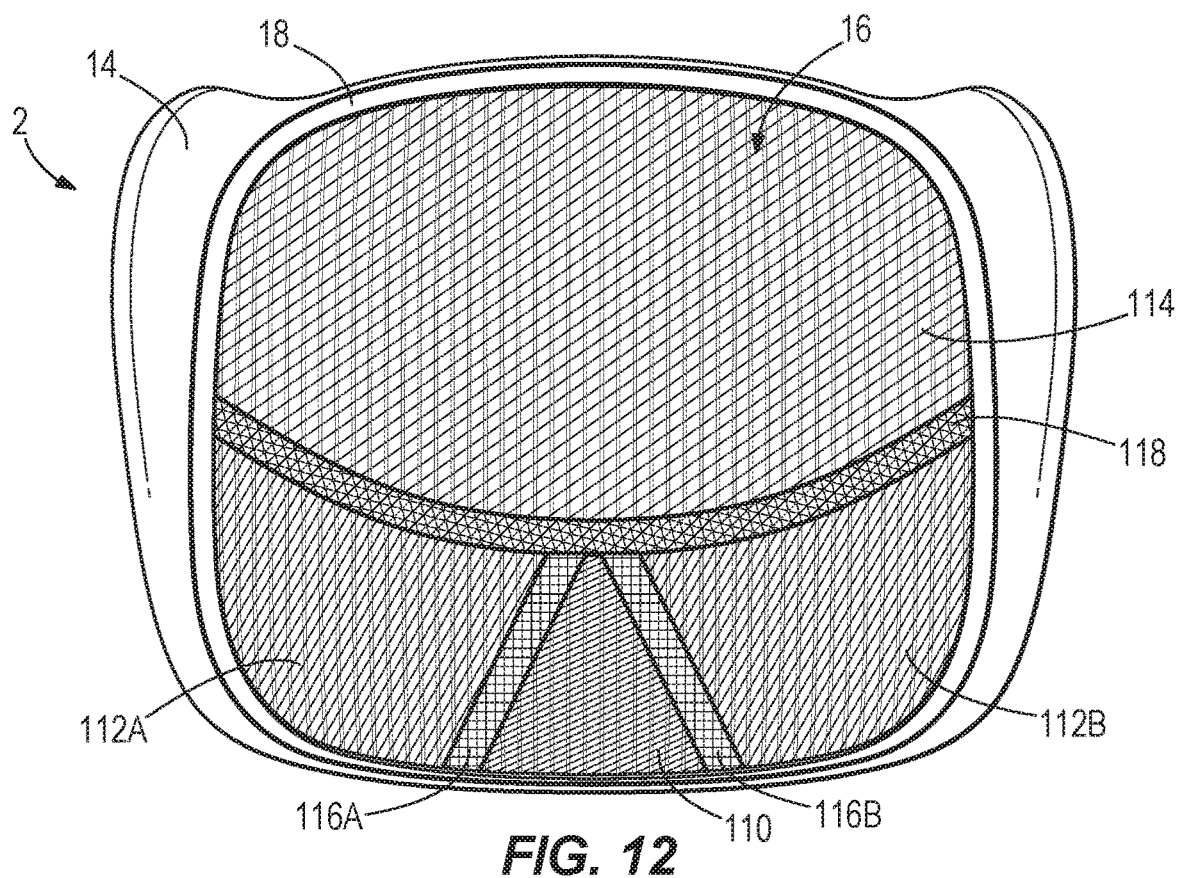
FIG. 12 is a top view of a seat with exemplary zones.

FIG. 12 shows a seat 2 having a front zone 110, side zones 112A and 112B, and a rear zone 114, with each zone having a stiffness or stiffness range. The suspension material 16 also includes side transition zones 116A, 116B and a rear transition zone 118. In an exemplary embodiment, the front zone no has a greater stiffness or range than the side zones 112A, 112B and the side zones 112A, 112B have a greater stiffness or range than the rear zone 114. The side transition zones 116A, 116B have a stiffness or range between that of the front zone no and the side zones 112A, 112B and the rear transition zone 118 has a stiffness or range between that of the side zones 112A, 112B, and the rear zone 114.

Figure 13:
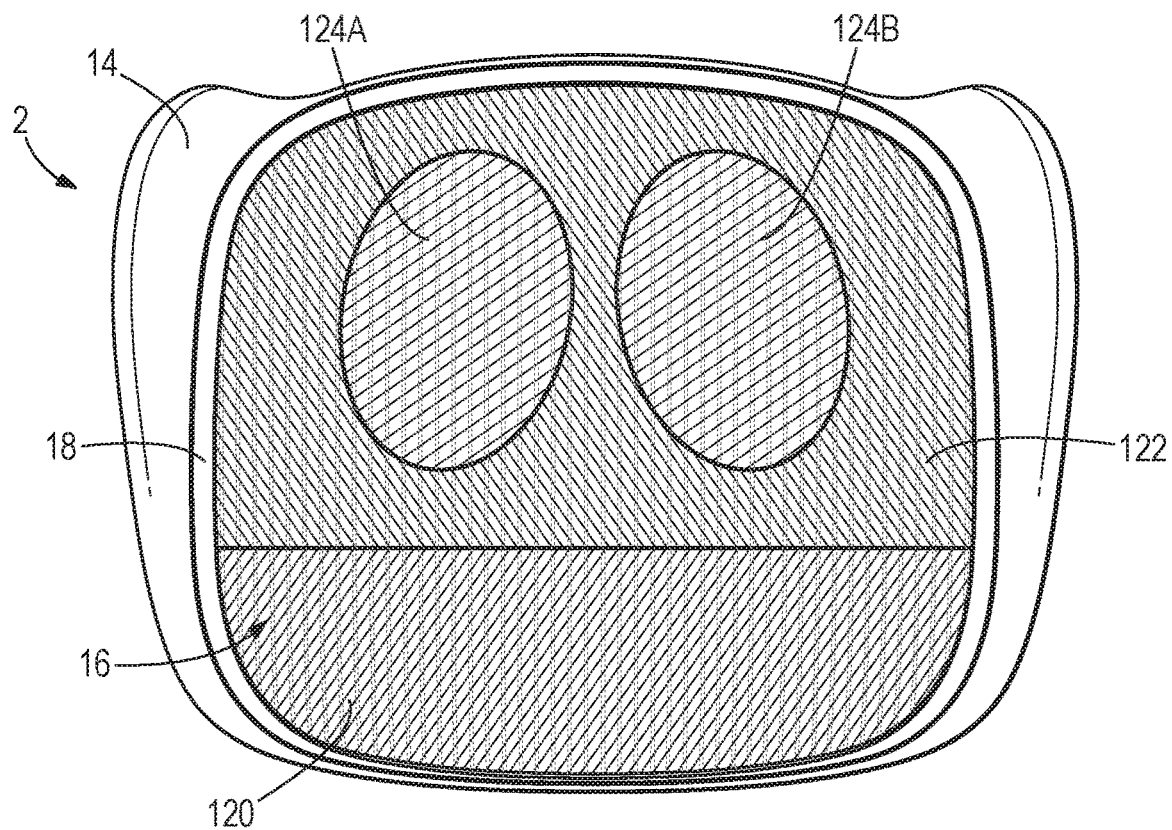
FIG. 13 is a top view of a seat with exemplary zones.

FIG. 13 shows a seat 2 having a front zone 120, a rear zone 122, and pocket zones 124A, 124B, with each zone having a stiffness or stiffness range. In an exemplary embodiment, the front zone 120 has a greater stiffness or range than the middle zone 122 and the middle zone 122 has a greater stiffness or range than the pocket zones 124A, 124B.

Figure 14:
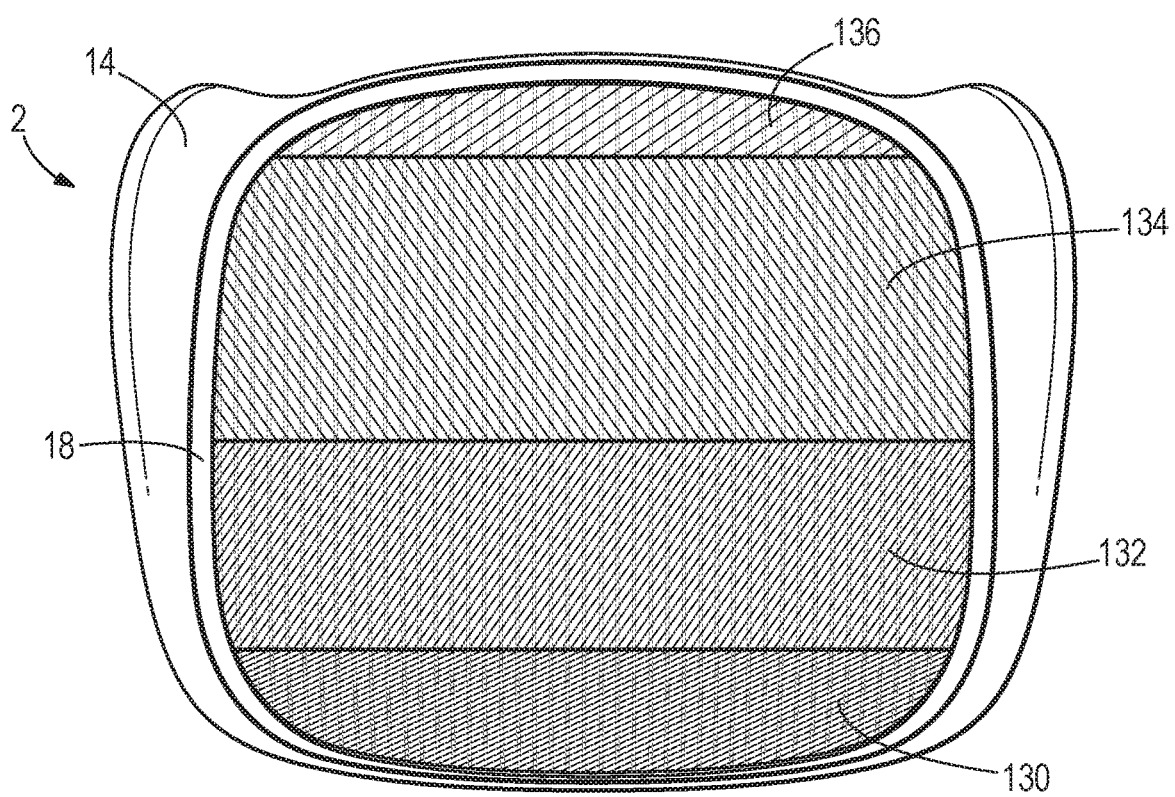
FIG. 14 is a top view of a seat with exemplary zones.

FIG. 14 shows a seat having a front zone 130, a first middle zone 132, a second middle zone 134, and a rear zone 136, with each zone having a stiffness or stiffness range. In an exemplary embodiment, the first zone has a first stiffness or range, the second zone has a second stiffness or range lower than the first stiffness or range, the third zone has a third stiffness or range lower than the first stiffness or range and lower than the second stiffness or range, and the fourth zone has a fourth stiffness or range lower than the first stiffness or range and higher than the second and third stiffness or range. According to another exemplary embodiment, the third zone has a standard stiffness, the second zone has approximately 1.2 times the standard stiffness, the first zone has approximately 3 times the standard stiffness, and the fourth zone has approximately 2 times the standard stiffness.

As shown above, the size, number, and spacing of the zones can be varied according to different considerations, for example ergonomic considerations.

In certain embodiments, the greater stiffness zones or ranges include higher elastic modulus monofilaments 26, monofilaments 26 running in more than one direction, or a greater density of monofilaments 26. In other embodiments, the greater stiffness zones or ranges include monofilaments 26 that are stretched a greater amount than other areas, for example, a 3% increase in stretch (displacement), which may correspond to about 0.95 inches greater stretch for a blank size of 31.5 inches, with the understanding that displacement depends on blank size. In one embodiment, the monofilaments 26 in the greater stiffness zones or ranges have a modulus from approximately two to six times the elastic modulus of a standard monofilament, while the lower side zones have an elastic modulus up to one half the standard monofilament, meaning, for example, that the center zones 50, 60 and side zones 56A-B, 64A-B have a stiffness ratio from 4:1 to 6:1. In one embodiment, the fibers have ratios relative to a standard monofilament in the range of 0.75:x to 2.25:x based on changing elastic modulus only.

Figure 15:
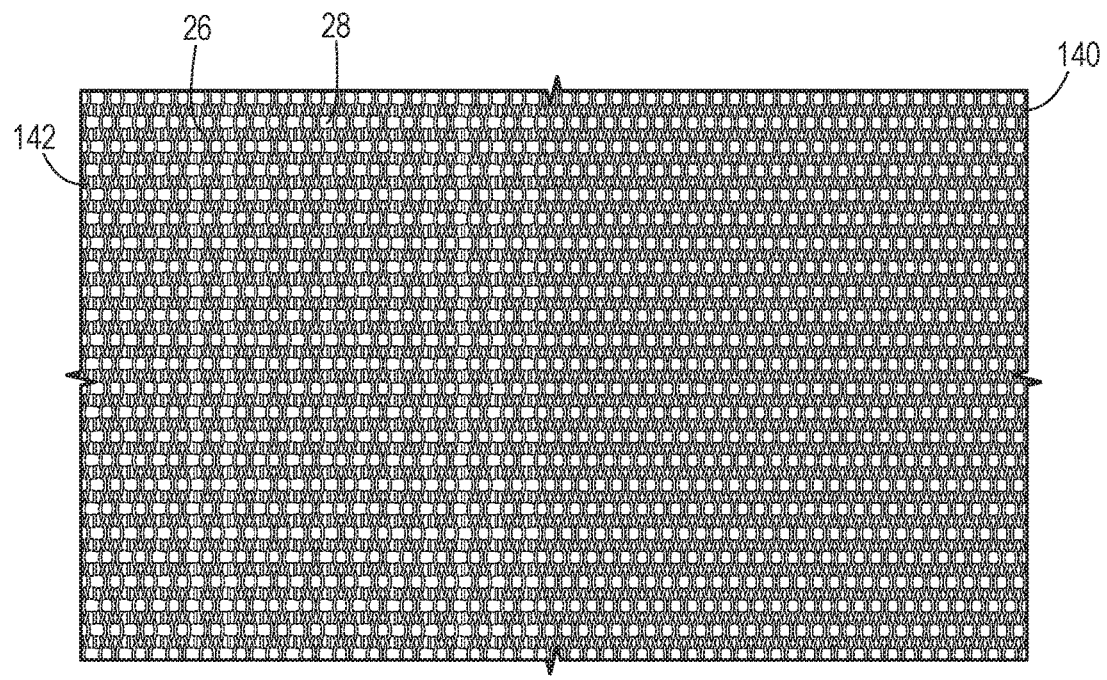
FIG. 15 is a partial view of an exemplary suspension material.

Similarly, stiffness can be reduced in the soft, flexible, or other less stiff zones or ranges, for example the upper side zones 64A, 64B and lower side zones 68A, 68B shown in FIG. 6 by using monofilaments 26 and/or multifilaments 28 with a lower elastic modulus. Another method to reduce tension is by eliminating monofilaments within a zone. For example, FIG. 15 shows a standard region 140 and a second region 142 having a reduced stiffness. In an exemplary embodiment, one out of three or four monofilaments are eliminated to provide a reduced stiffness, for example to provide an area for the user's shoulder blades to sink into. The multifilaments 28 may also be decoupled from the monofilaments 26 to make the regions less stiff, or the density of monofilaments 26 may be reduced in these areas, which may increase the space between monofilaments 26. The stiffness can be that of the standard or it can be less, for example between approximately 0.25 standard and the standard level of stiffness.

Figure 16:
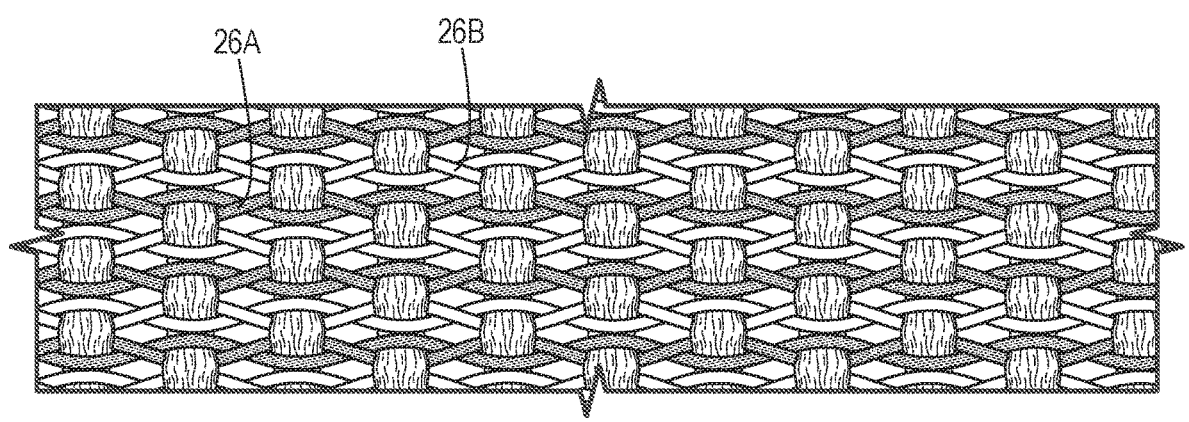
FIG. 16 is a partial view of an exemplary suspension material.

One exemplary embodiment of controlling the stiffness in the transition zones is to use a combination of higher modulus monofilaments 26A and lower modulus monofilaments 26B in a single region as shown in FIG. 16. The number and spacing can vary as needed. FIG. 16 shows alternating pairs but the higher and lower monofilaments 26A, 26B may also be interwoven with one crossing strand being a higher modulus monofilament 26A and the other being a lower modulus monofilament 26B. Other ways of altering the stiffness in the transition zones, such as controlling the density or any other method discussed herein, may also be used.

According to various exemplary embodiments, ET is used to adjust the stiffness of the suspension material 16, 22. For example, the mechanical properties of the suspension material 16, 22 (e.g., elastic modulus/durometer) may be varied. In addition, or alternatively, the stretch rate of the suspension material 16, 22 in different zones may be varied, for example by locally stretching certain zones to achieve high tension areas. In addition, or alternatively, the monofilament 26 density may be varied across the suspension, e.g., with more fibers being provided in higher tension areas. It should be understood that combinations of these various methods may also be employed.

Figure 17:
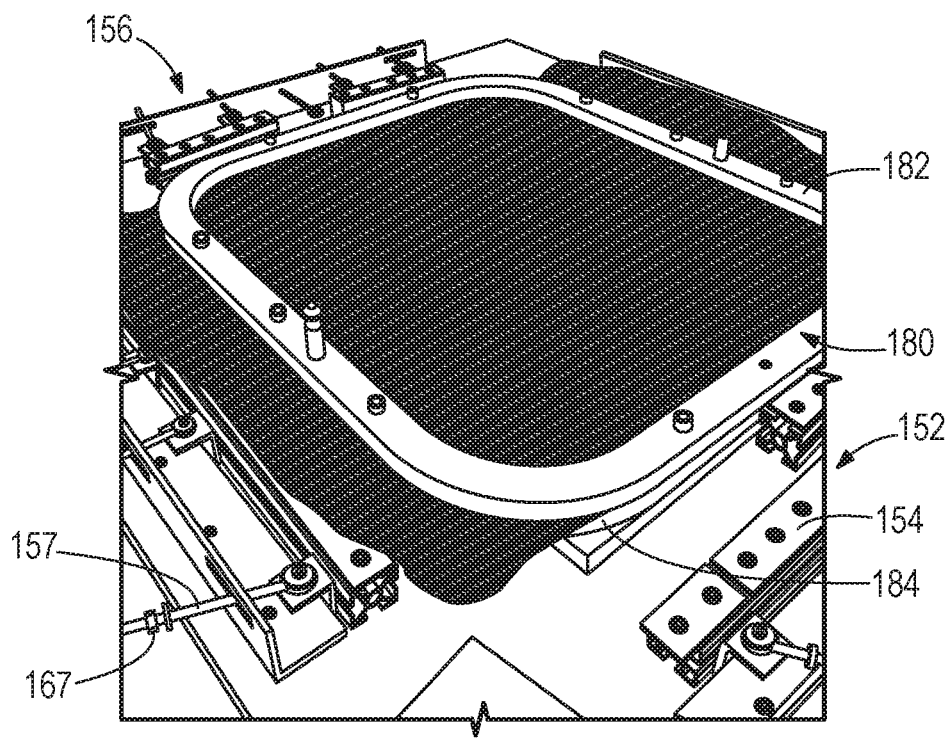
FIG. 17 is a partial view of an exemplary tensioning apparatus.
Figure 18:
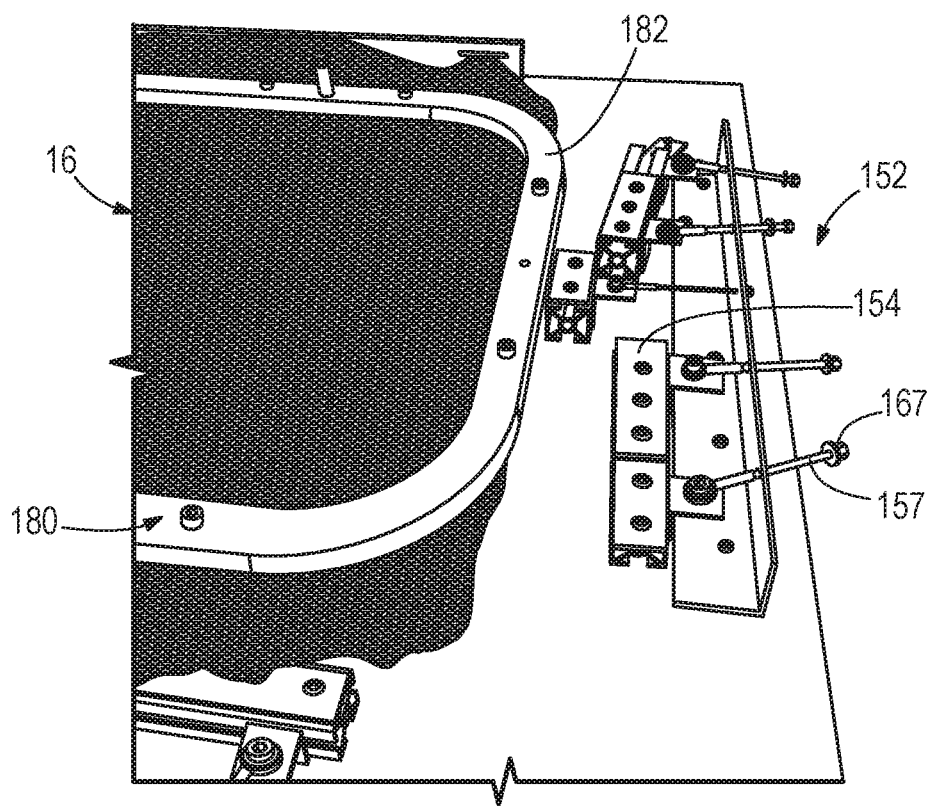
FIG. 18 is another partial view of the tensioning apparatus of FIG. 16.

Referring to FIGS. 17-21, the suspension material 16 may be mechanically manipulated to create differential stiffness. The mechanical manipulation may be applied to suspension or engineered textiles embodied in a woven or a 3D knitted construction. In one embodiment, an apparatus for making a suspension member 16 with differential stiffness includes a support frame 150 or bed, and a first plurality of clamping elements 152 connected to and independently moveable relative to the frame 150 in at least a first direction. The clamping elements of the first plurality 152 each include a clamping head 154 moveable between a clamped and released position. In one embodiment, a second plurality of clamping elements 156 are also connected to and independently moveable relative to the frame 150 in at least a second direction orthogonal to the first direction. The clamping elements of the second plurality 156 also each include a clamping head 154 moveable between a clamped and release position. It should be understood that the second plurality 156 may be omitted, or that a single clamping element extending along the length of the blank may be provided as shown in FIG. 17.

The apparatus may also include a third plurality of clamping elements 160 and a fourth plurality of clamping elements 162 spaced apart respectively from the first and second pluralities 152, 156, with the third and fourth pluralities 160, 162 also being independently moveable relative to the frame 150, and relative to the opposite first and second pluralities 152, 156. In other embodiments, the third and fourth pluralities 160, 162 may be stationary. The third and fourth pluralities 160, 162 may be replaced by a single third and fourth clamping element, whether moveable or stationary.

In one embodiment, the number of clamping heads 154 in the second plurality 156 is greater than the first plurality 152. In one embodiment, the first plurality 152 includes between 2 and 15 clamping elements, and may include 5-6 clamping elements, and in one embodiment, 13 clamping elements. In one embodiment, 11 clamping elements are provided for the vertical zones (top to bottom of backrest 4 and front to back of seat 2) and 13 clamping elements are provided for the horizontal zones (side to side of backrest 4 and seat 2).

Figure 19:
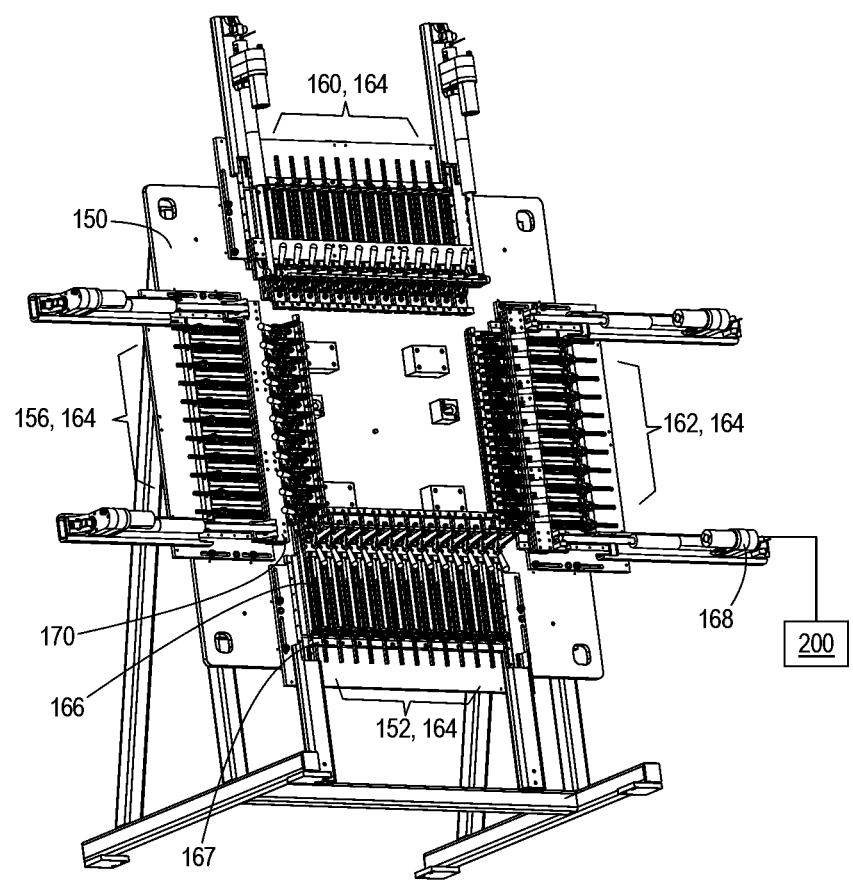
FIG. 19 is a perspective view of another exemplary tensioning apparatus.
Figure 20:
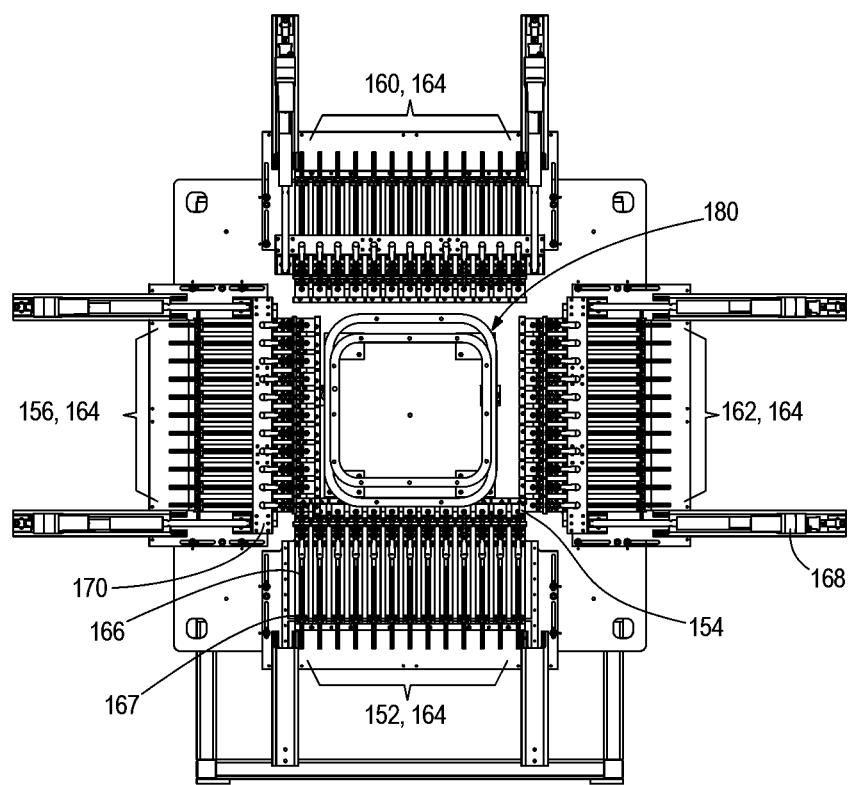
FIG. 20 is front view of FIG. 18.
Figure 21:
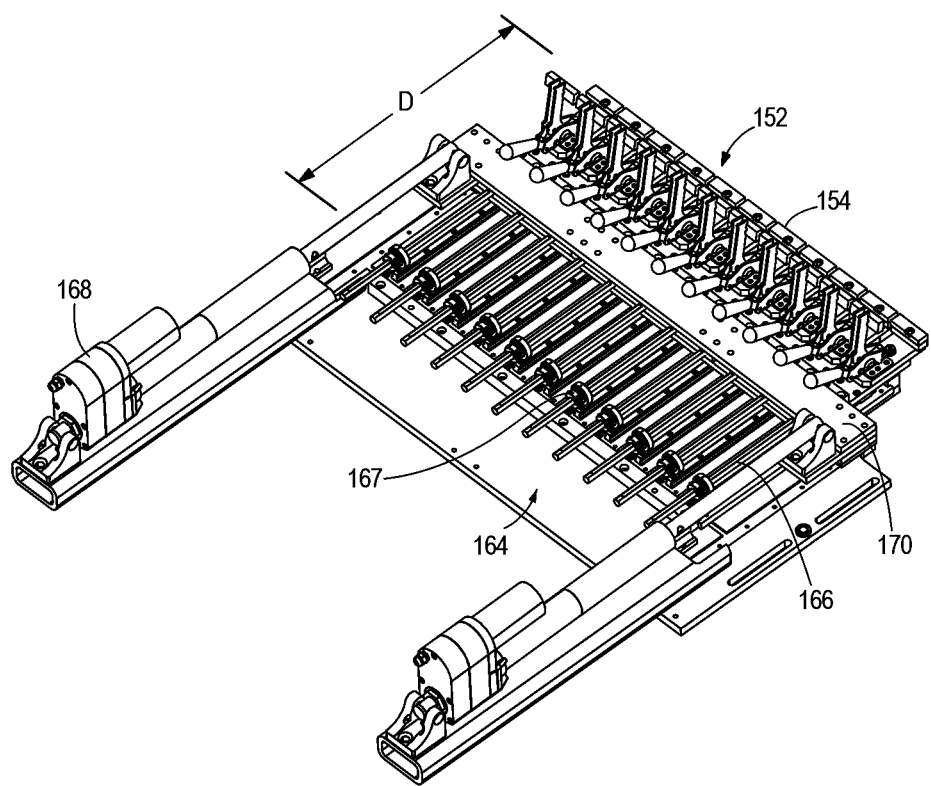
FIG. 21 is a perspective view of a plurality of clamping elements of FIG. 18.
Figure 22:
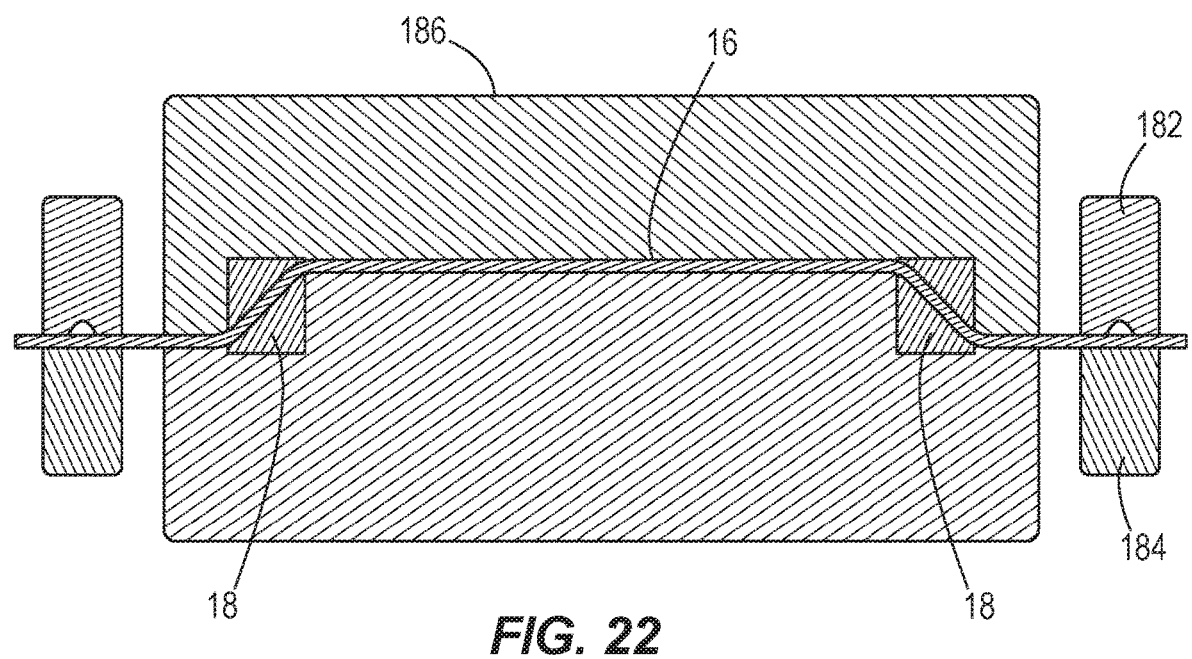
FIG. 22 is a sectional, schematic view of a mold assembly.

In one embodiment, shown in FIGS. 19-21, a plurality of clamping elements are individually moved by a corresponding plurality of actuators 164, with each actuator 164 controlled to axially move a respective clamping element. The actuators 164 may be pneumatic, for example driven by air, or electro-mechanical, for example servo motors driving spindles.

Clamping elements 154 are secured to rods 157 having collars 167. The collar 167 may be adjustably positioned along the shaft of the rod 157, so as to vary the distance D between the clamping element and collar 167. A cross bar 170 then engages the collars 167, with the clamping elements 154 having a shorter distance D between the clamping element 154 and collar 167 being engaged by the cross bar 170 first, and thereby successively applying more tension than the other clamping elements having a respectively longer distance D.

According to an exemplary embodiment, a subassembly includes a pair of macro actuators 168 connected to the frame cross bar 170. It should be understood that a single actuator 168 may suffice. The individual clamping elements are secured to rods 166 configured with collars 167. The collars 167 may be independently positioned along a respective rod 166, and relative to the cross bar 170, for example by adjustably threading the collars, or with set screws or other clamping arrangements. The cross bar 170 is then movable relative to the rods 166. This provides for independent stretch control of each clamping element.

In various exemplary embodiments, the apparatus also includes a loom 180 configured with first and second loom members 182, 184 positionable adjacent and between the first, second, third and fourth pluralities of clamping members. The loom 180 defines a perimeter and interior area, with some of the clamping members lying outside of perimeter/area of the loom perimeter/area.

In operation, the method of making a suspension member 16 with differential stiffness includes providing a blank of suspension material, which is positioned over a lower loom member 184. The first, second, third and fourth pluralities of clamping members are clamped onto, and engage the blank, although fewer clamping members are utilized depending on the number of pluralities of clamping members.

A controller 200 sends a control signal to the plurality of actuators 164, which are independently linearly moveable, such that the blank is stretched by the clamping members. Alternatively, the collars 167 are moved to predetermined positions on their respective rods 166, and the clamping members are engaged with the blank of suspension material 16. The controller 200 sends a control signal to the macro actuators 168, such that that cross bar 170 is moved and successively picks up, or engages, the collars 167 and moves the corresponding clamping members to induce the predetermined and desired stretch. Due to the independent movement capability of each clamping member, in either embodiment, the blank may be stretched different amounts by each clamping member, thereby inducing a different amount of tension to different zones of the blank of suspension material, and thereby making the blank the same, more, or less stiff in each zone relative to other zones. For example, as shown in 18-20, a center one of the first plurality of clamping members 152 is moved a greater distance than the other ones of the first plurality, such that a central zone is provided with additional tension, and resulting stiffness. When the final stretching of each clamping member is achieved, an upper loom member 182 is secured to the lower loom member 184, thereby clamping the blank between the loom members in the desired stretched condition. The clamping members may then be released, with the loom 180 retaining the blank in the differentially stretched configuration. The loom 180 and stretched blank may then be positioned in a mold tool 186, such that the carrier member 18, 24 may be molded to the blank. After the carrier member 18, 24 is molded, the blank may be released from the loom, and any excess edge material trimmed from the outside of the carrier member 18, 24. The suspension member 16, 22 is then ready for installation on a seating structure frame.

According to various exemplary embodiments, TES can be used to adjust the stiffness of the suspension material 16. TES monofilament and multifilament chemistry and process provides for a suspension material 16 to be tensioned via application of energy to the material after it is encapsulated into a carrier 18 and/or frame system 14. The flexibility of the TES process allows for localized energy application and tensioning to create zonal suspension properties across a seating surface, including for example and without limitation, the various zones described herein respect to the seat 2 and backrest 4. Additionally, a global energy application may create a zonal tension pattern by varying the mechanical properties of the suspension material 16 locally through the pattern of the fabric as also described herein. TES fabric can be produced in a woven (Leno or Jacquard) or a knit construction, for example 3D, circular, flat bed, and/or known knitting processes. One exemplary embodiment includes a woven material although embodiments may use a similar concept in a knitted construction. The TES monofilament and multifilament construction includes high shrinkage filament chemistry, for example (Polyester Elastomer, TPC-ET) 5556/5556RS Hytrel and DSM alternatives. The properties of the suspension material 16 may be varied by altering the mechanical properties, the size of the filament, the shape of the filament (e.g., oval filament size to minimize carrier flashing), the density of the filaments in the weave pattern, the shrink characteristics of the material (e.g., high shrinkage material), the denier of multifilament (e.g., 1400-2900, and may be between 1500 and 2000, or 1600 vs. typical 2900 for conventional suspension materials), and durometer ranges from 40 to 75 (conventional suspension materials are about 55 durometer).

Figure 23:
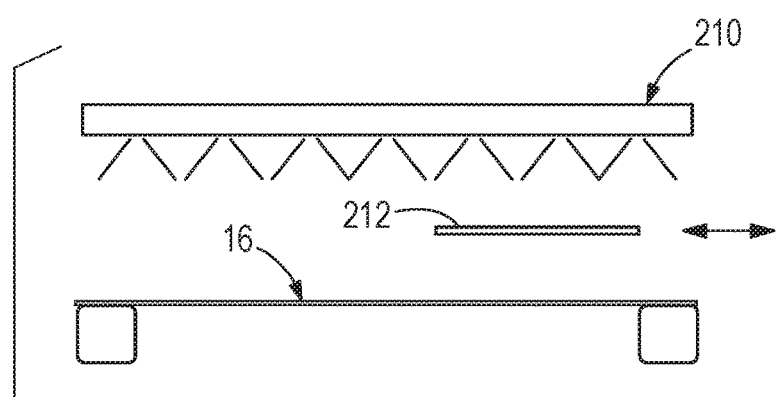
FIG. 23 is a schematic view of an exemplary thermal tensioning apparatus.

The application of energy to the suspension material 16 can be performed in a number of ways. In various embodiments, the suspension material 16 is molded into the carrier frame 18 in a relaxed state, for example with little to no pre-tension. In one example the suspension material 16 is molded with less than approximately 5% stretch, or approximately 0 to 5% stretch. In another example the suspension material 16 is molded with less than approximately 5% stretch As best shown in FIG. 23, energy may be applied by an energy source 210 globally and/or locally to achieve the desired zoned stiffness properties, for example as described above. The surface of the suspension material may also be shielded with a shield 212 to achieve the zoned properties. For example, a zone of desired less stiffness may be shielded with the shield 212 during the application of the energy from the source 210 so that less shrinkage is induced. Process variables that can be used to control the tensioning, include Time, Distance, Temperature and Power of the heat source. The energy source may include: high temperature steam application, forced hot air, laser, microwaves, high output UV, infrared emitter, plasma, and/or contact heat.

In other embodiments, portions or an entirety of the suspension material 16 may be put in tension when the suspension material 16 is attached to the frame 14. In either embodiment, tension may be introduced to the suspension material 16, or increased as desired, after the suspension material 16 is attached to the frame 14. In other exemplary embodiments, the tension can be introduced prior to attachment to the frame 14.

Any of the methods of varying the stiffness or the levels of stiffness discussed herein can be incorporated into any of the embodiments discussed above.

Figure 24:
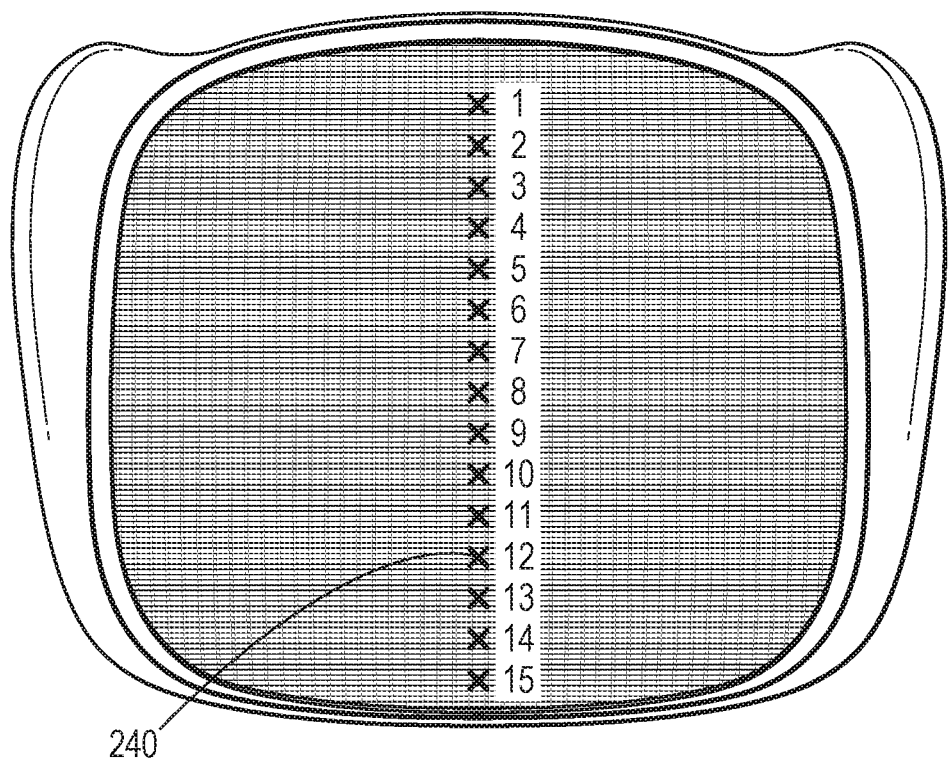
FIG. 24 is a top view of a seat with exemplary testing points.
Figure 25:
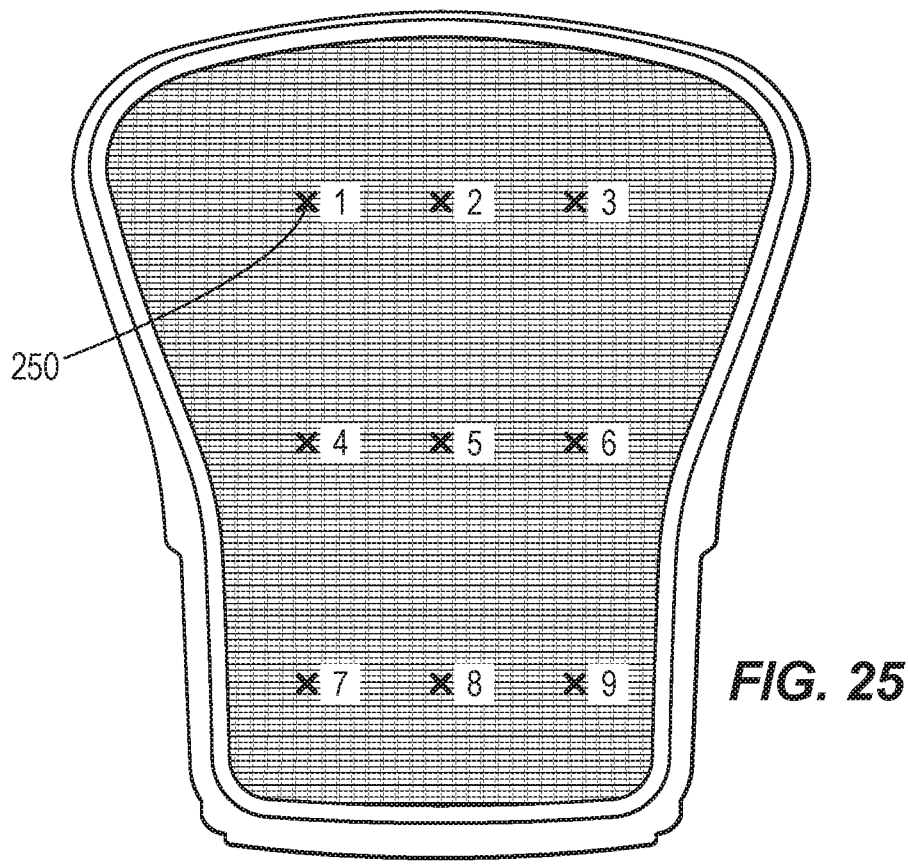
FIG. 25 is a front view of a backrest with exemplary testing points.
Figure 26:
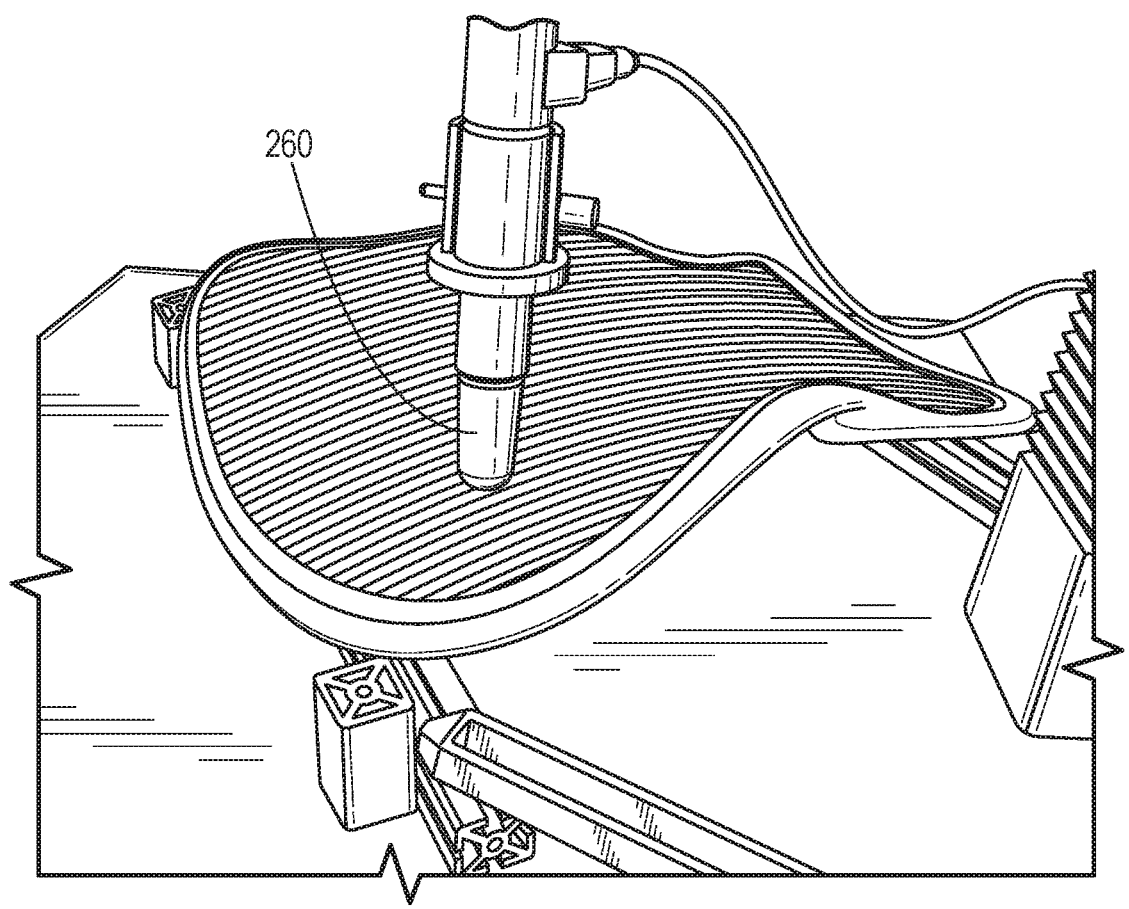
FIG. 26 is a partial perspective view of an exemplary testing apparatus.

Other exemplary embodiments are directed to a method of testing the stiffness of different zones using indentation force deflection (IFD). Different locations can be tested on the seat 2 and the backrest 4, with the resultant force being measured. At least one measurement point per zone is used. FIG. 24 shows 15 measurement points 240 for the seat 2 and FIG. 25 shows 9 measurement points 250 for the backrest 4. One type of IFD test is described in US Publication 2013/0099548 A1, the entire disclosure of which is hereby incorporated herein by reference. In the past, a global 6 inch diameter IFD measurement is used to measure the suspension response. This measurement technique does not provide enough resolution to the zonal suspension properties being created by the present embodiments. As shown in FIG. 26, a smaller 1 or 1.5 inch diameter indentor 260 is used to study the suspension performance in a grid pattern.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed.

Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A method of making a body support member with differential stiffness comprising:
   providing a blank of suspension material, the blank including a plurality of zones with different stiffness formed at least in part by the suspension material having non-uniform elastic modulus, each zone having monofilaments and multifilaments, wherein some of the monofilaments or the multifilaments extend across the plurality of zones, wherein at least one of the plurality of zones is a transition zone combining high modulus monofilaments and low modulus monofilaments in a single region;
   engaging the blank of suspension material with a plurality of clamping elements along at least one side of the suspension material; and
   applying different tensions to the blank of suspension material with different clamping elements by moving the clamping elements in a direction parallel to a plane defined by the blank of suspension material.

2. The method of claim 1, further comprising securing clamping the blank of suspension material in a loom when the blank of suspension material is tensioned by the plurality of clamping members in the tensioned state.

3. The method of claim 1, wherein the plurality of clamping elements are connected to and independently moveable relative to a frame in a first direction.

4. The method of claim 3, wherein the plurality of clamping elements are actuated by one or more linear actuators.

5. The method of claim 3, further comprising engaging the blank of suspension material with a second plurality of clamping elements coupled to and independently moveable relative to the frame in a second direction orthogonal to the first direction, the second plurality of clamping elements each comprising a clamping head moveable between a clamped positioned and released position.

6. The method of claim 3, further comprising clamping the suspension material between an upper loom and a lower loom and disengaging the plurality of clamping elements.

7. The method of claim 6, further comprising molding the suspension material to a carrier.

8. The method of claim 1, wherein different tensions are applied in a horizontal direction to the blank of suspension material and in the vertical direction to the blank of suspension material.

9. The method of claim 1, wherein the high modulus monofilaments and the low modulus monofilaments of the transition zone are in alternating pairs.

10. A method of making a body support member with differential stiffness comprising:
    providing a blank of suspension material, the blank including a plurality of zones, each zone having monofilaments and multifilaments with different elastic modulus than another of the plurality of zones, wherein at least some of the monofilaments or the multifilaments extend across the plurality of zones wherein at least one of the plurality of zones is a transition zone combining high modulus monofilaments and low modulus monofilaments in a single region;
    engaging the blank of suspension material with a first plurality of clamping elements along a first side of the suspension material;
    engaging the blank of suspension material with a second plurality of clamping elements along a second side of the suspension material;
    applying tension to the blank of suspension material in a first direction with the first plurality of clamping elements by moving the first plurality of clamping elements in a first direction that is parallel to a plane defined by the blank of suspension material; and
    applying tension to the blank of suspension material in a second direction with the second plurality of clamping elements by moving the second plurality of clamping elements in a second direction that is parallel to the plane defined by the blank of suspension material, wherein the second direction is different from the first direction.

11. The method of claim 10, wherein the second direction is perpendicular to the first direction.

12. The method of claim 10, wherein the first plurality of clamping elements and the second plurality of clamping elements are connected to and independently moveable relative to a frame.

13. The method of claim 10, wherein the first plurality of clamping elements and the second plurality of clamping elements are linearly moveable.

14. The method of claim 10, wherein the first plurality of clamping include a plurality of moveable clamping heads receiving the blank of suspension material.

15. The method of claim 10, further comprising molding the suspension material to a carrier.

16. The method of claim 15, wherein the carrier is configured as a seat member.

17. The method of claim 10, wherein the high modulus monofilaments and the low modulus monofilaments of the transition zone are in alternating pairs.

18. A method of making a body support member with differential stiffness comprising:
    providing a blank of suspension material, the blank including a plurality of zones, each zone having monofilaments and multifilaments with different elastic modulus than another of the plurality of zones, wherein at least some of the monofilaments or the multifilaments extend across the plurality of zones wherein at least one of the plurality of zones is a transition zone combining high modulus monofilaments and low modulus monofilaments in a single region;
    engaging the blank of suspension material with a first clamping element and a second clamping element along a first side of the suspension material;
    engaging the blank of suspension material with a third clamping element and a fourth clamping element along a second side of the suspension material;
    applying a first amount of tension to the blank of suspension material in a first direction with the first clamping element by moving the first clamping element in a first direction that is parallel to the plane defined by the blank of suspension material;
    applying a second amount of tension to the blank of suspension material in the first direction with the second clamping element, wherein the second amount of tension is different than the first amount of tension;
    applying a third amount of tension to the blank of suspension material in a second direction with the third clamping element by moving the third clamping element in a second direction that is parallel to the plane defined by the blank of suspension material; and applying a fourth amount of tension to the blank of suspension material in the second direction with the fourth clamping element, wherein the fourth amount of tension is different than the third amount of tension.

19. The method of claim 18, wherein the first clamping element, the second clamping element, the third clamping element, and the fourth clamping element are each independently moveable relative to a frame.

20. The method of claim 18, wherein applying the first amount of tension, second amount of tension, third amount of tension, and fourth amount of tension comprises moving the respective clamping element in an axial direction via one or more actuators.

21. The method of claim 18, further comprising clamping the suspension material between an upper loom and a lower loom.

22. The method of claim 21, further comprising molding the suspension material to a carrier and attaching the carrier to a chair frame.

23. The method of claim 18, wherein the high modulus monofilaments and the low modulus monofilaments of the transition zone are in alternating pairs.

\* \* \* \* \*